United States Patent
Schilling-Benz et al.

(10) Patent No.: US 7,702,229 B2
(45) Date of Patent: Apr. 20, 2010

(54) LENS ARRAY ASSISTED FOCUS DETECTION

(75) Inventors: Lynn Schilling-Benz, Fairport, NY (US); John N. Border, Walworth, NY (US); Thomas F. Powers, Webster, NY (US); Russell J. Palum, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 821 days.

(21) Appl. No.: 11/550,429

(22) Filed: Oct. 18, 2006

(65) Prior Publication Data
US 2008/0095523 A1 Apr. 24, 2008

(51) Int. Cl.
- G02B 7/28 (2006.01)
- G03B 7/099 (2006.01)
- H04N 5/225 (2006.01)
- G01B 9/04 (2006.01)
- G02B 21/00 (2006.01)

(52) U.S. Cl. ........... 396/111; 348/340; 250/201.8; 250/208.1

(58) Field of Classification Search ............ 396/111
See application file for complete search history.

(56) References Cited

U.S. PATENT DOCUMENTS

| | | | |
|---|---|---|---|
| 5,089,843 A | 2/1992 | Higashihara et al. | 396/95 |
| 5,333,028 A | 7/1994 | Akashi et al. | 396/104 |
| 5,337,115 A | 8/1994 | Mukaiya | 348/349 |
| 5,790,257 A * | 8/1998 | Kim | 356/401 |
| 6,396,045 B1 * | 5/2002 | Ballingall et al. | 250/208.1 |
| 6,452,664 B2 | 9/2002 | Miwa | 356/3.04 |
| 6,643,460 B2 | 11/2003 | Uchiyama et al. | 396/114 |
| 6,709,796 B2 * | 3/2004 | Irving et al. | 430/21 |
| 6,765,617 B1 * | 7/2004 | Tangen et al. | 348/340 |
| 2001/0045989 A1 | 11/2001 | Onuki | 348/345 |
| 2003/0063212 A1 | 4/2003 | Watanabe et al. | 348/349 |
| 2004/0070679 A1 | 4/2004 | Pope | 348/231.99 |
| 2004/0100573 A1 | 5/2004 | Nonaka | 348/345 |
| 2007/0263226 A1 * | 11/2007 | Kurtz et al. | 356/492 |

OTHER PUBLICATIONS

U.S. Appl. No. 11/496,913, filed Aug. 8, 2006.

* cited by examiner

*Primary Examiner*—Melissa J Koval
(74) *Attorney, Agent, or Firm*—William R. Zimmerli

(57) ABSTRACT

A focus detection device includes an image sensor and a plurality of lenslets. Each of the plurality of lenslets has a distinct conjugate length and is associated with a distinct portion of the image sensor.

16 Claims, 23 Drawing Sheets

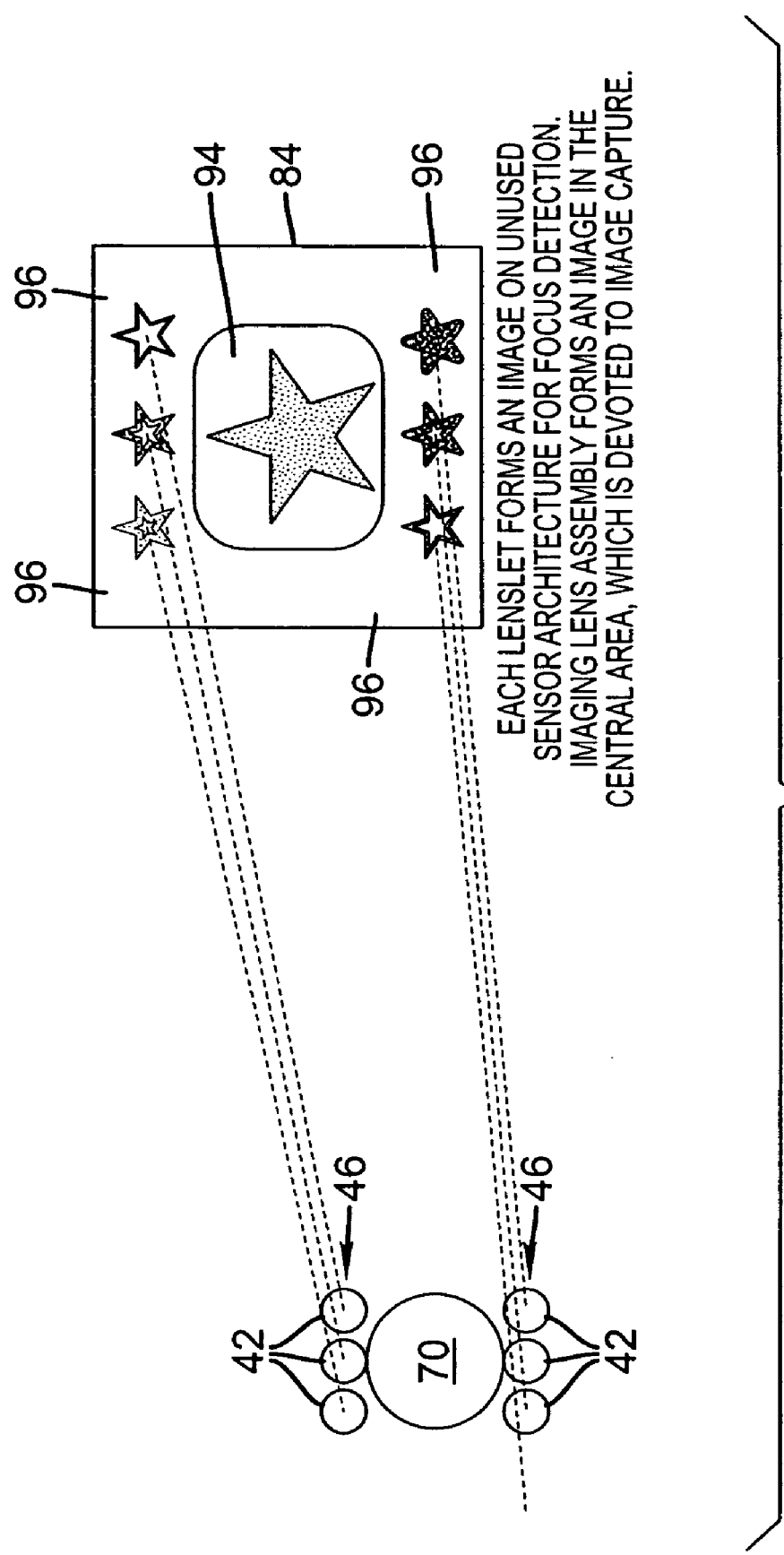

LENS ARRAY ASSISTED FOCUS DETECTION

FIELD OF THE INVENTION

The present invention relates generally to the use of a lenslet array to provide a series of low resolution images that can be used to guide an image capture device.

BACKGROUND OF THE INVENTION

Digital cameras photoelectrically convert the image of an object on an image sensor and store the image data in memory or the like. Focus detection devices for automatic focusing of digital still cameras usually rely on one of the following methods: Hill-Climbing focus detection; passive triangulation; active triangulation; phase difference detection; hybrid autofocusing; software focusing correction; and focus detection using a phase control plate and high frequency filters.

In Hill-Climbing focus detection, the taking lens of an image sensing optical system is moved incrementally along the optical axis, and an image is acquired for each incremental lens position. Each of the acquired images are analyzed for focus quality (for example, contrast or sharpness), and after motion through all lens positions and analysis are completed, the lens is moved to the position with best focus for image capture. The lens may be moved to an intermediate position if the software analysis predicts optimum focus at an intermediate plane. US Patent Application Publication No. 2003/0063212 A1 proposes using a Hill-Climbing technique in which the focus evaluation values calculated are weighted in correspondence to the focusing lens position when the focus evaluation values are calculated.

The accuracy of the Hill-Climbing focus detection technique is very good due to the fact that the image itself is used to determine focus quality and hence the final lens position. Many lens motions are however required, making this technique very slow. Another disadvantage is that hill-climbing autofocus systems tend to work poorly in low light situations where contrast levels are generally low.

In passive triangulation focus detection, two images of an object are formed on a focus detection sensor by two optical systems spaced apart by a predetermined base length, and the absolute distance to the object is determined from the spacing between the two images formed. The lens is moved directly to the calculated position for image capture. Passive triangulation is faster than Hill-Climbing focus detection since only one final lens motion is required, however low light situations are still challenging. In addition, since the focal length and base-length of the range-finding optical system cannot be made very large due to space constraints on the camera, to insure focus accuracy, the dimensional precision of the component parts must be very high, and the image forming optical system must be well calibrated with the passive triangulation system In active triangulation focus detection, a light projection system emits a signal, which is reflected off the subject and subsequently is detected by a light receiving system, such as a silicon photodiode array. The absolute distance to the subject is determined by the spacing between the light source and detected signal. The lens is moved directly to the position for image capture. This technique is very fast since the taking lens only has to be moved once to its final calculated position, and since an active source is used, such as an IR emitter as disclosed in U.S. Pat. No. 6,452,664, low light conditions do not pose a problem. There are two major disadvantages to this method of autofocusing. The first disadvantage relates to accuracy, as with passive triangulation, to insure focus accuracy, the dimensional precision of the component parts must be very high, the component parts such as lenses must be environmentally stable, and the image forming optical system must be well calibrated. In U.S. Pat. No. 6,452,664, a method of using multiple range-finding operations is suggested to improve focus accuracy, however this method does not address the environmental stability of the component parts such as lenses and it does not change the need for close calibration between the image forming system and the passive triangulation system. The second disadvantage to relying on active range-finding is that a faulty lens position could be chosen if there is a transparent obstruction (e.g. glass window pane) between the camera and the object, in which case the lens is focused on the obstruction. Alternatively, if part of the subject is a very smooth surface such as water, and the pulse is incident at an oblique angle, the IR pulse is deflected away from the camera, and focusing cannot be achieved.

In phase difference detection, optical images that have been formed by passage through different pupil areas of an image sensing optical system are formed again as a pair of secondary images via a secondary image forming optical system, and the state of focus is determined from the spacing between the two secondary images. The lens is moved directly to the position for image capture. With phase difference detection since there is no additional light source, transparent obstructions and smooth surfaces are not a problem. In addition, phase difference detection systems are fast since only one final lens motion is required. They have the additional advantage that they can be operated through the objective lens (i.e. by inserting an optical module as disclosed in US Patent Application Publication No. US2001/0045989A1 or by deflecting part of the light to a separate image sensor as disclosed in U.S. Pat. No. 6,643,460B2). The disadvantage of inserting an optical module is that moving parts are necessary. The disadvantage of deflecting part of the light to a separate image sensor is that some of the image forming light is lost. In both cases, calibration is critical since an additional optical path is used to determine focus. An additional disadvantage of this technique is that low light situations can compromise the effectiveness of the technique, requiring active autofocusing as in passive triangulation.

In hybrid autofocusing, a combination of the Hill Climbing focus detection and a range finding technique such as active triangulation is used to reduce disadvantages experienced when either technique is used alone. The range finder provides a rough initial focus quickly, and the Hill-Climbing focus detection system uses a reduced number of images to determine the final lens position with best contrast, see, for example, US Patent Application Publication No. 2004/0100573A1 and U.S. Pat. No. 5,333,028. Hybrid systems are faster than purely Hill-Climbing focus detection based systems since the number of lens motions is reduced, however they are still slower than range-finding alone or phase detection systems, where only one lens motion is required.

In software corrections autofocusing, intelligent processors use scene recognition or predictive lens motion based on calculated image position to infer correct lens position, see, for example, US Patent Application Publication No. 2004/0070679 A1 and U.S. Pat. No. 5,089,843. Image capture occurs continuously and selection of lens position is chosen based on a typical shutter delay. The disadvantage of relying on software correction is that it is prone to errors if a change of velocity or motion direction occurs.

U.S. Pat. No. 5,337,115 discloses focus detection using a phase control plate and high frequency filters. In U.S. Pat. No. 5,337,115, a focus-detecting device is described for a video camera application. A phase plate is mounted onto the image sensor, such that light flux impinging on alternating rows of image sensor elements has traversed one of two possible optical path lengths. The image seen by the first group of elements will thus have a different focus quality than the image seen by the second group of elements. Focus quality in this application is determined by analyzing the high frequency content of the image. From the relative focus quality factors, it is determined whether the image is in focus, and if not, which direction the lens must travel. This technique has the advantage that it is a through the lens technique and it is fast since theoretically only one motion is required. However the image quality is degraded due to the alternating structure of the phase plate (possibly resulting in banding, for example).

SUMMARY OF THE INVENTION

An object of the present invention is to provide a focus detection device or automatic focusing device to be used in a digital camera or the like, adopting a simple structure that is capable of determining a focal point position quickly and accurately. An additional object of the invention is to eliminate the necessity of multiple lens motions, thus significantly reducing the shutter lag, also known as click-to-capture time, as well as reducing battery drain.

According to one aspect of the invention, a focus detection device includes an image sensor and a plurality of lenslets. Each of the plurality of lenslets has a distinct conjugate length and is associated with a distinct portion of the image sensor.

According to another aspect of the invention, a method of detecting focus includes providing a plurality of images on a first image sensor by causing light to pass through a plurality of lenslets, each of the plurality of lenslets having a distinct conjugate length; determining relative focus quality by comparing the plurality of images to each other; and adjusting a distance between a taking lens and a second image sensor, the distance corresponding to a functional relationship between the conjugate lengths of the plurality of lenslets and the relative focus quality.

According to another aspect of the invention, an image capture device includes a focus detection device including a first image sensor; and a plurality of lenslets, each of the plurality of lenslets having a distinct conjugate length, each of the plurality of lenslets being associated with a distinct portion of the first image sensor; a taking lens; and a second image sensor, the second image sensor being associated with the taking lens.

According to another aspect of the invention, the focus detection device includes an array of lenslets arranged such that in-focus images occur in different conjugate planes. The lenslet conjugate planes are chosen to span the possible range of conjugate planes of the image capture lens produced by different object distances. The image sensor used by the detection device is located at a position within the span of lenslet focal planes, preferably at approximately a central position. An array of images of the subject is formed on the image sensor by the lenslets, however the images have a varying degree of sharpness or contrast. The image sensor captures all images from the lenslet array simultaneously, and the contrast level of each image is determined. The image with the highest contrast indicates a position of the image capture lens with very good focus quality. The image capture lens can then be moved directly to that position for image capture. However, the image capture lens to image sensor distance does not need to correspond exactly to one of the lenslet focal planes, but rather can be at an intermediate location. The relationship of the contrast level to lenslet focal plane is used to predict the optimum lenslet image distance, using interpolation or curve fitting. This information is then used to determine the optimum imaging lens to image sensor distance, using calibration information previously stored. The number of lens motions is reduced from a multitude to a single motion, and thus shutter lag is significantly reduced.

According to another aspect of the invention, the image sensor used for focus detection can be a dedicated image sensor, so that a completely separate optical device is used for focus detection. The information obtained by the focus detection device is then used to drive the image capture lens to its optimum focus position. Alternatively, one image sensor can be shared between both the focus detecting system and the image capture system using a drop-in mirror or beam splitter technique or the like. The image sensor can also be shared by utilizing pixels outside the imaging area on the image sensor to capture the focus detection images.

The invention can be used to determine optimum focus for a single field area, for example a central portion of the field imaged by the taking lens. Alternatively, the entire field can be divided into regions of interest by dedicating groups of lenslets to each field area of interest; alternatively the images produced by each of the lenses can be analyzed by looking at points corresponding to different field points.

Those skilled in the art will recognize that the present invention provides the opportunity to collect additional information about the scene or imaging conditions during the auto-focusing step, which may be useful to image capture or camera setup conditions. This is because the autofocus images are generally representative of the actual captured images, with the exceptions that they may have lower resolution and may have a smaller field of view. The lenslet array as described in the invention provides a series of images in which at least one of the images will always be in focus, thereby providing a low resolution image that can be captured quickly and analyzed to help guide the capture and image processing of the higher resolution image. Thus one could for example increase the effective dynamic range of the image sensor by analyzing the autofocus images for brightness conditions, increasing the gain for portions of the image sensor corresponding to lower light conditions, and the like. It is conceivable that further information could be obtained from the autofocus images and utilized in subsequent camera operations.

BRIEF DESCRIPTION OF THE DRAWINGS

In the detailed description of the preferred embodiments of the invention presented below, reference is made to the accompanying drawings, in which:

FIG. 8 is a schematic representation of the invention in an image capture device in which an image sensor is shared between the image acquisition and focus detection systems by utilizing unused image sensor architecture;

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
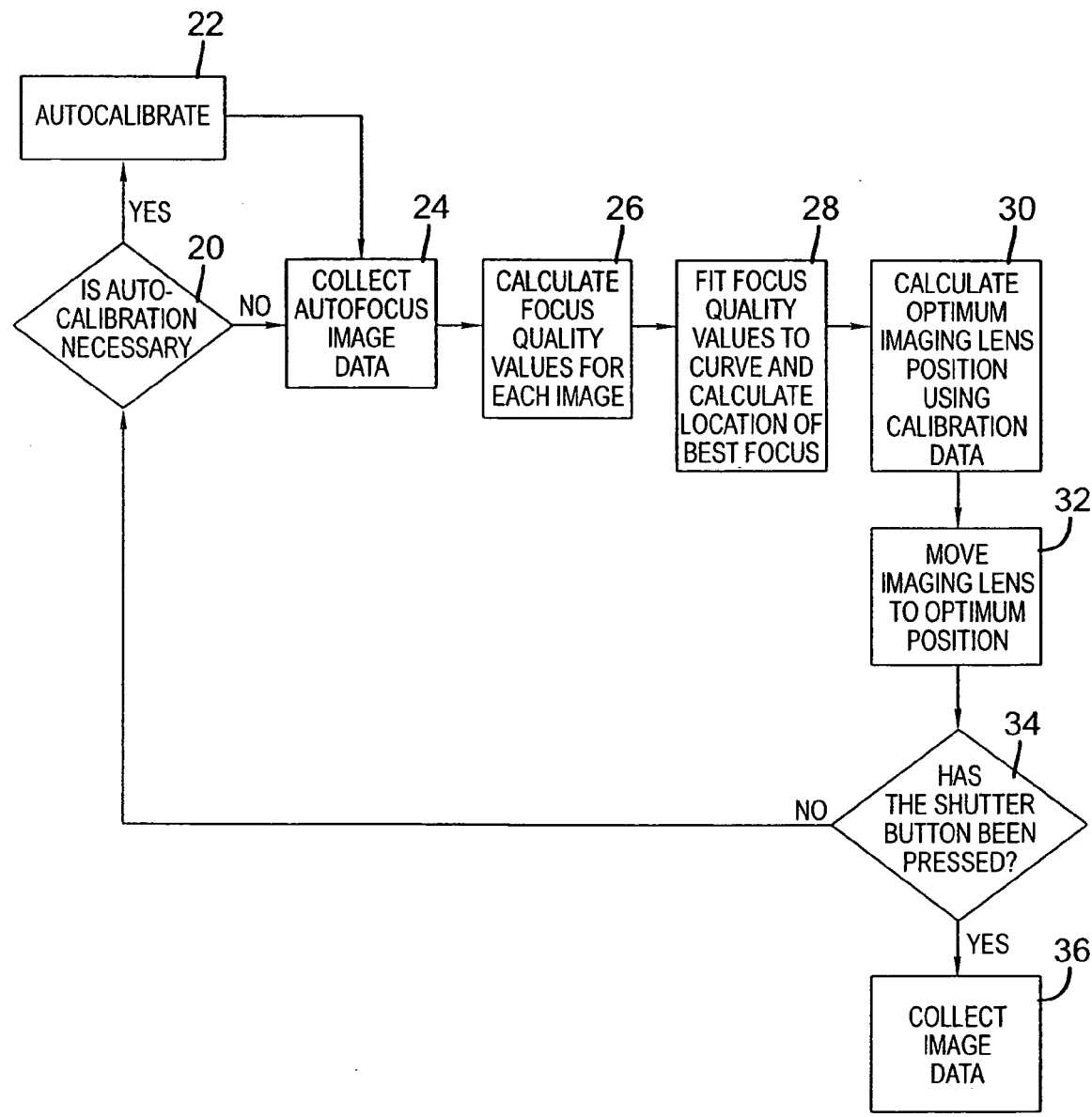
FIG. 1 is a block diagram illustrating the basic sequence of events involved in autofocusing.

Referring to FIG. 1, a block diagram illustrating the basic sequence of events involved in autofocusing as it relates to the present invention is shown. Generally described, a method of detecting focus includes providing a plurality of images on a first image sensor by causing light to pass through a plurality of lenslets, each of the plurality of lenslets having a distinct conjugate length; determining relative focus quality by comparing the plurality of images to each other; and adjusting a distance between a taking lens and a second image sensor, the distance corresponding to a functional relationship between the conjugate lengths of the plurality of lenslets and the relative focus quality. Relative focus quality can be determined by determining relative contrast levels of each of the plurality of images, by determining relative frequency content of each of the plurality of images, or by determining relative compressed file size of each of the plurality of images.

The process can begin, but does not have to begin, with step 20 by determining whether auto-calibration is necessary. Initial auto-calibration may be necessary because an image capture device incorporating the present invention has two optical paths, the optical path of the focal point detection device and the optical path used for image acquisition in the image capture device. Auto-calibration can occur during start-up only, or periodically while using the image capture device, or if a change in environmental conditions is detected by image sensors in the image capture device. When it is determined that auto-calibration is necessary, an auto-calibration technique is employed by the image capture device. The technique described in U.S. patent application Ser. No. 11/496,913, filed on Aug. 8, 2006, entitled "Automatic Focus System Calibration" is an example of an auto-calibration technique that can be used.

After auto-calibration is completed in step 22 or when it is determined that auto-calibration is not necessary, the process continues (or begins) with step 24 by collecting autofocus image data from the focus detection device. This data is analyzed in step 26 and step 28 to determine the contrast of the image formed by each lenslet of the focus detection device. Focus quality values for each image produce by each lenslet are calculated in step 26. The focus quality values are then fit to a curve and the location of best focus is calculated in step 28. This data is then used in conjunction with the calibration data, if appropriate, to determine the optimum taking lens position in step 30. The image taking lens of the image capture system is moved, if necessary, to the optimum position in step 32. The optimum taking lens position selected by the system may be a position intermediate to the taking lens to image sensor distances corresponding to the individual lenslets of the lenslet array of the focus detection device because the contrast data is fit to the curve to predict where the maximum contrast should occur. If the shutter button has been pressed in step 34 image data is collected and stored in step 36. If the shutter button has not been pressed in step 34, the autofocusing sequence can be repeated.

Referring to FIGS. 2-6, example embodiments of the invention are described. In each embodiment, focus detection device 40 includes a plurality of lenslets 42 and an image sensor 44. Each of the plurality of lenslets 42 has a distinct conjugate length and is associated with a distinct portion of image sensor 44.

Figure 2:
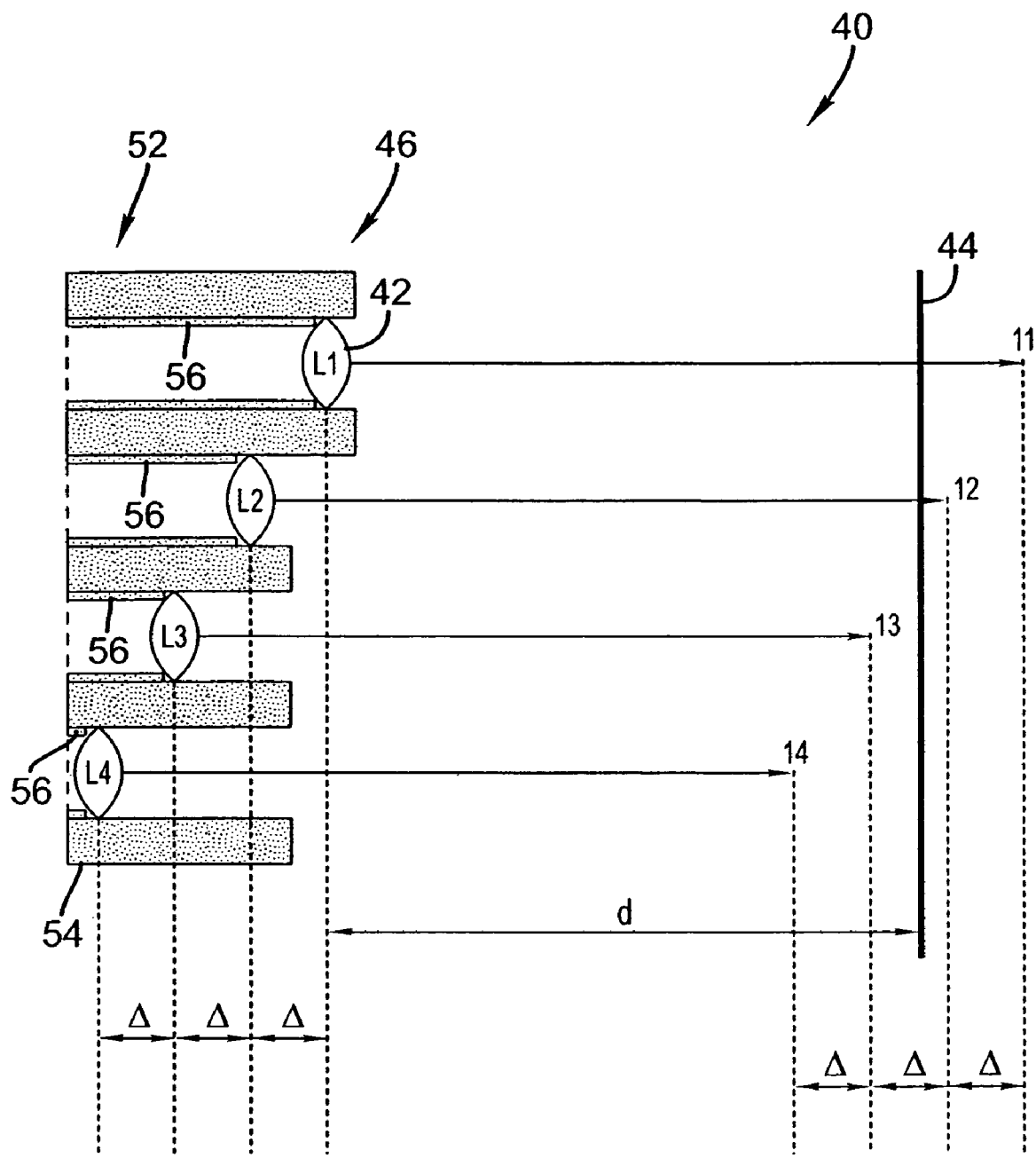
FIG. 2 is a schematic representation of optical components of a first example embodiment of the invention showing an array of lenslets and associated conjugate planes or lengths for each individual lenslet, and an image sensor.

Referring to FIG. 2, a schematic representation of a first example embodiment of the invention is shown. In the focus detection device 40 shown in FIG. 2, the distinct conjugate length of each of the plurality of lenslets 42 is achieved by virtue of each of the plurality of lenslets being positioned at distinct distances from image sensor 44.

Figure 3:
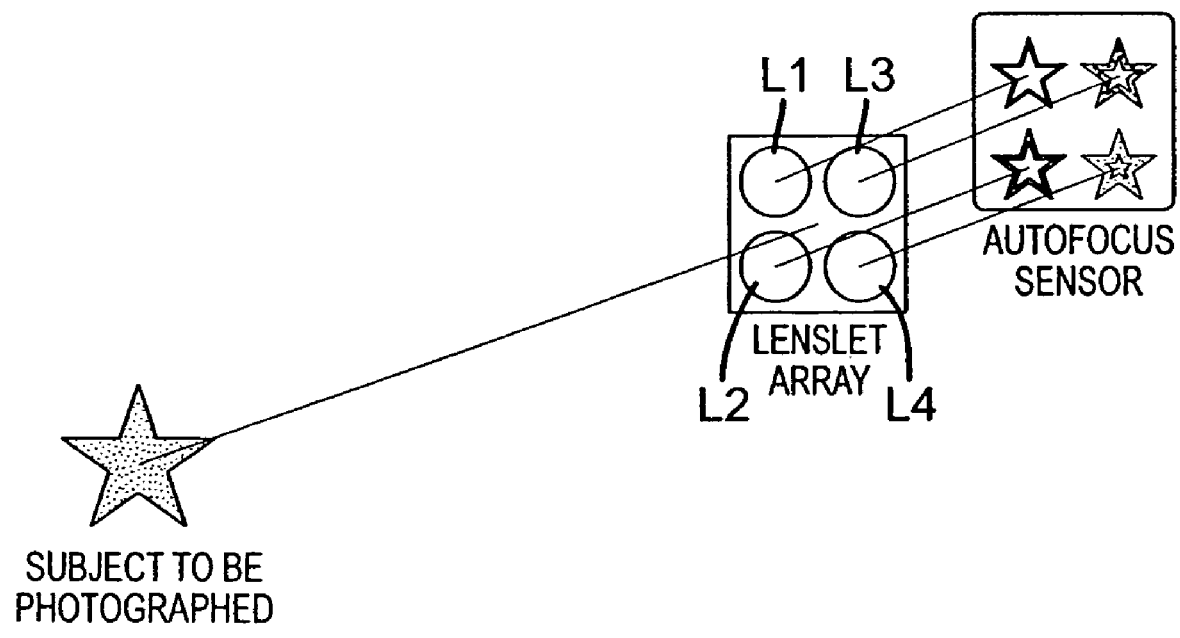
FIG. 3 is a schematic representation of the varying focal quality of the images produced by each lenslet.

Lenslets 42, depicted as L1, L2, L3, and L4, are arranged in an array 46 and physically positioned in planes separated by a distance Δ. As such, image planes I1, I2, I3, and I4 produced by lenslets 42 are also separated by a distance Δ. Image sensor 44 is placed at a distance d intermediate to image planes I1, I2, I3, and I4, so that the focal quality of the images from lenslets L1, L2, L3, and L4 differs, as is illustrated in FIG. 3. In this manner, each lenslet 42 corresponds to a specific predetermined image taking lens-to-image sensor distance. Accordingly, focus detection device 40 can be manufactured so that lenslet array 46 spans a full range of possible image taking lens-to-image sensor positions for a given image capture device.

Lenslets 42 are held in place using a lens retaining device 52. For example, lens retaining device 52 can be a lens barrel 54 having spacers 56 located therein to appropriately position each individual lenslet relative to each other and image sensor 44. Alternatively, lenslets 42 can be manufactured, for example, molded, as a single unit while maintaining the appropriate positioning of each lenslet relative to other lenslets. In operation, light flux coming from a subject impinges on image sensor 44 after passing through lenslet array 46 of focus detection device 40.

Referring to FIG. 3, a schematic representation of the varying focal quality of the images produced by lenslets L1, L2, L3, and L4 is shown. As each lenslet L1, L2, L3, and L4 is in focus in a different image plane I1, I2, I3, and I4, the images produced by lenslets L1, L2, L3, and L4 on image sensor 44 vary. The principle underlying this behavior is described in more detail with reference to FIGS. 4A-4C.

Figure 4A:
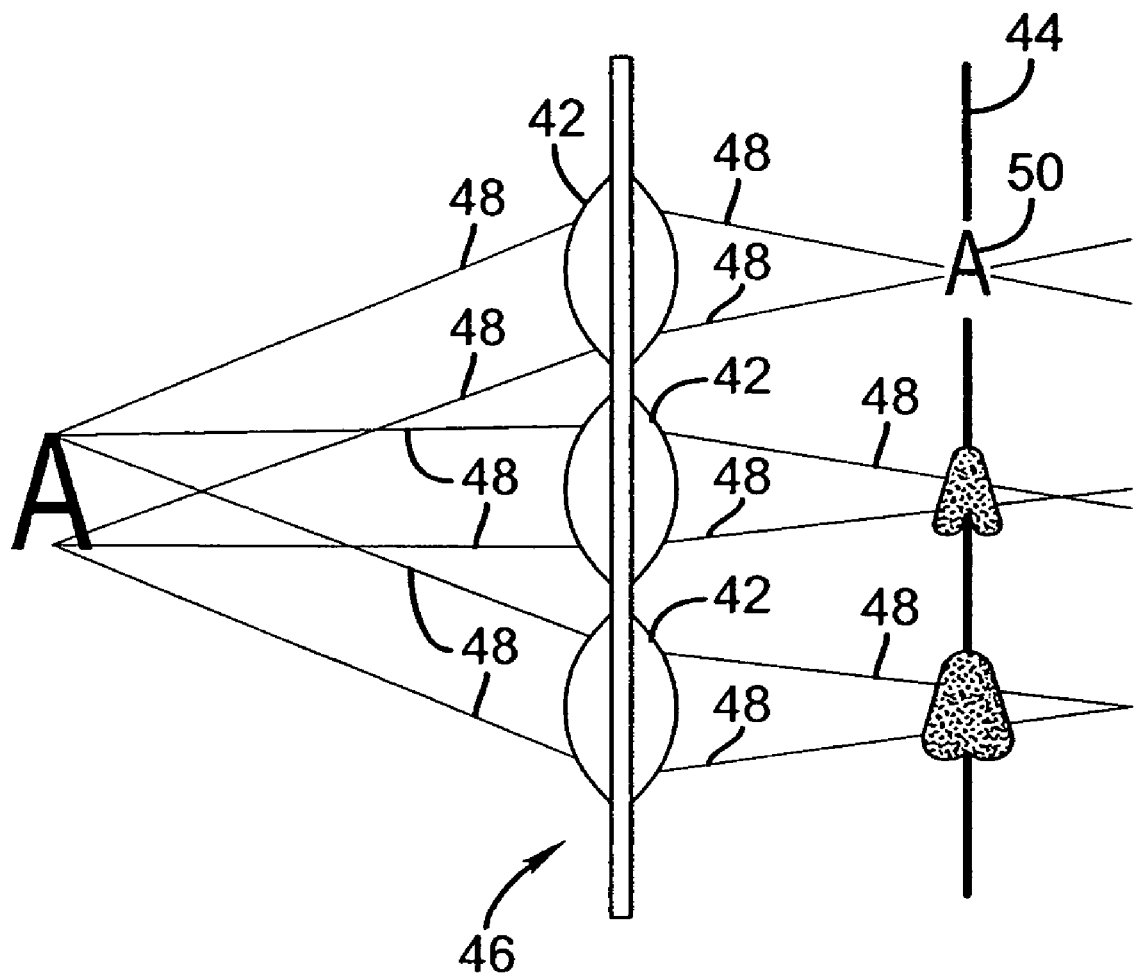
FIGS. 4A-4C are schematic representations showing the principle underlying the present invention.
Figure 4B:
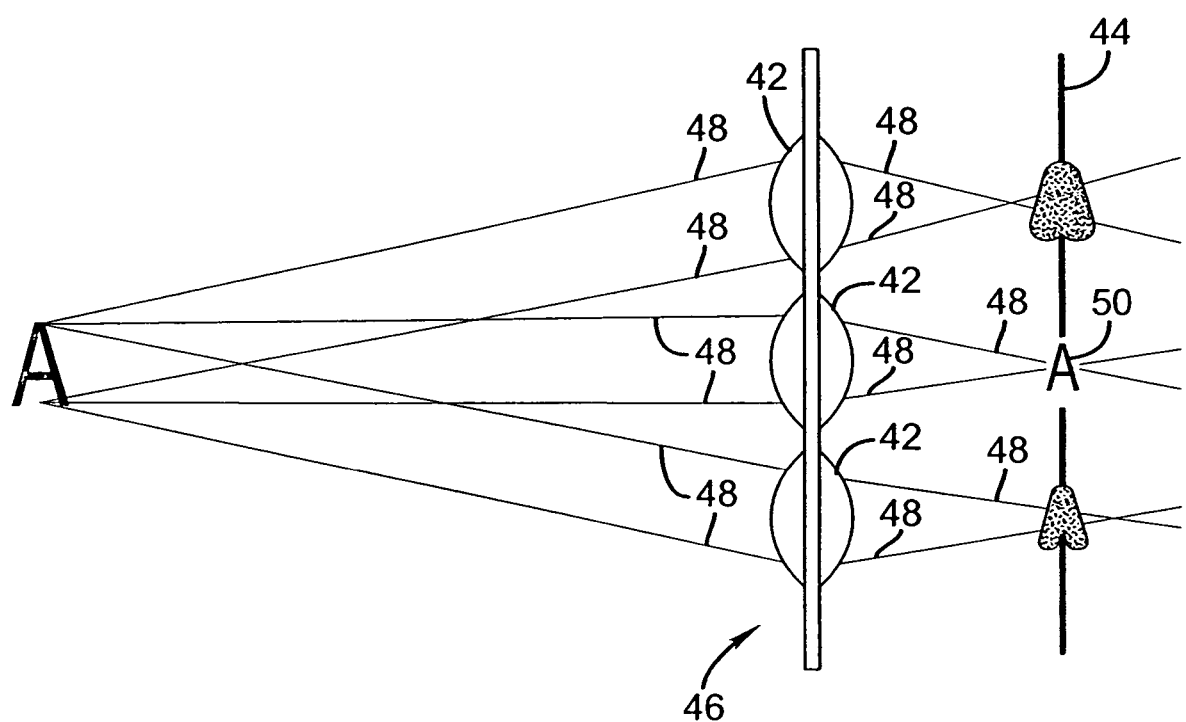
Figure 4C:
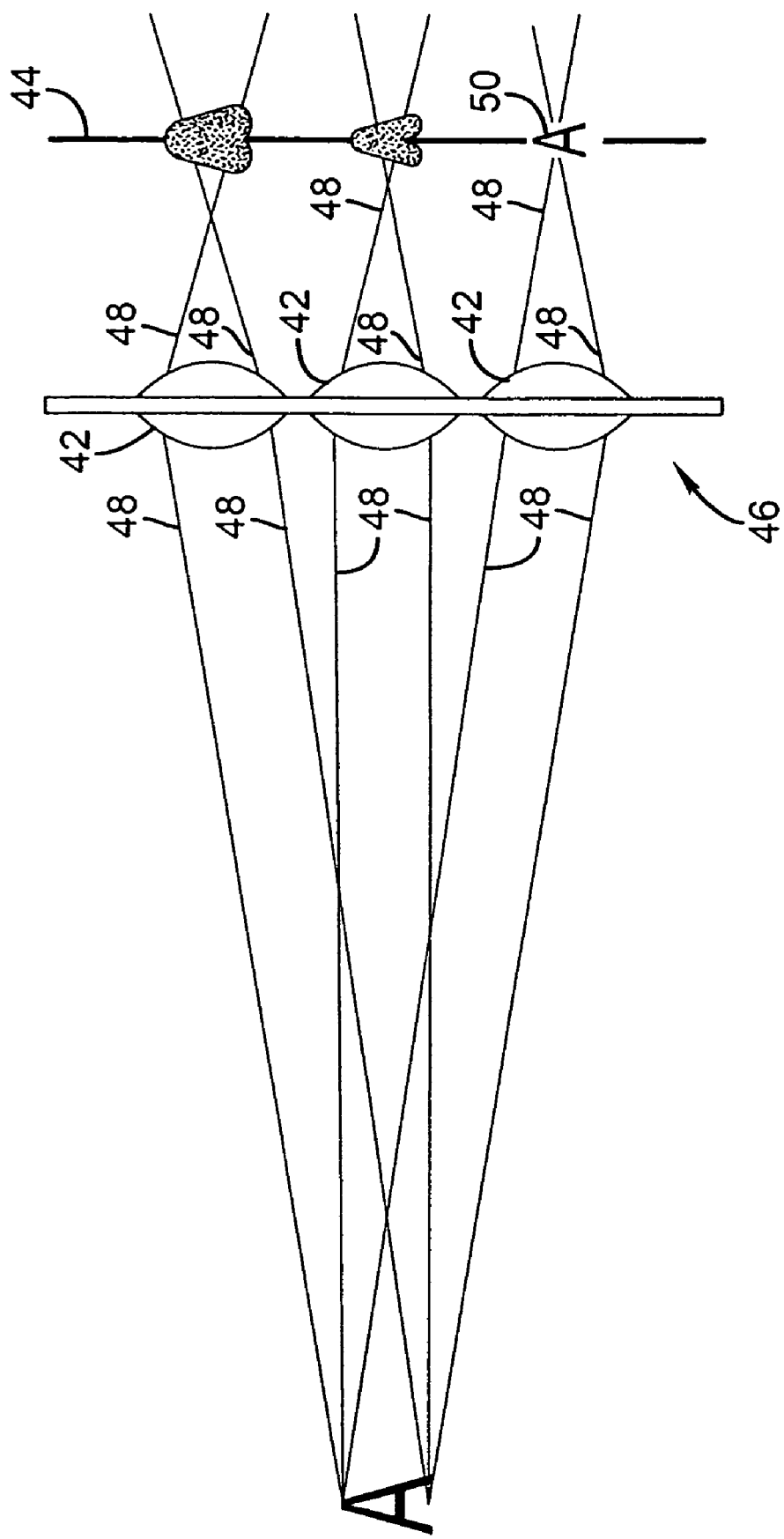

Referring to FIGS. 4A-4C, a subject to be imaged is depicted as the letter "A" on the left side of the figures. Light rays 48 indicate where imaging occurs for each lenslet 42 (imaging occurs where light rays 48 intersect and cross an optical axis 50 associated with one of lenslets 42). An in-focus image is indicated by sharp letter "A" while an out-of-focus image is indicated by a blurred letter "A" both letters being shown on the right hand side of the figures. While a three element lenslet array 46 is shown in FIGS. 4A-4C, lenslet array 46 can include more or less individual lenslets 42.

FIG. 4A illustrates the case of a close-up subject. In this case, only the upper lenslet 42 yields an in-focus image while the other two lenslets 42 have their optimum focal planes behind image sensor 44 resulting in a blurred image. In FIG. 4B, an intermediate subject distance is depicted. In this case, the middle lenslet 42 has its optimum image plane closest to the plane of image sensor 44 while the optimum image plane of the upper lenslet 42 lies in front of image sensor 44 and the optimum image plane of the lower lenslet 42 lies behind image sensor 44. Thus, only the center lenslet 42 results in an in-focus image at image sensor 44. FIG. 4C illustrates a far away subject. In this case, only the lower lenslet 42 has an in-focus image at image sensor 44 while the upper two lenslets 42 have their optimum image planes in front of image sensor 44. Thus, only the lower lenslet 42 results in an in-focus image.

Image sensor 44 of focus detection device 40 can be used to collect the images formed by all lenslets 42 simultaneously. This data is then analyzed as described above with reference to FIG. 1. The relative contrast levels of the images are determined and used to predict the optimum taking lens position of the image capture device, for example, a digital camera.

Figure 5:
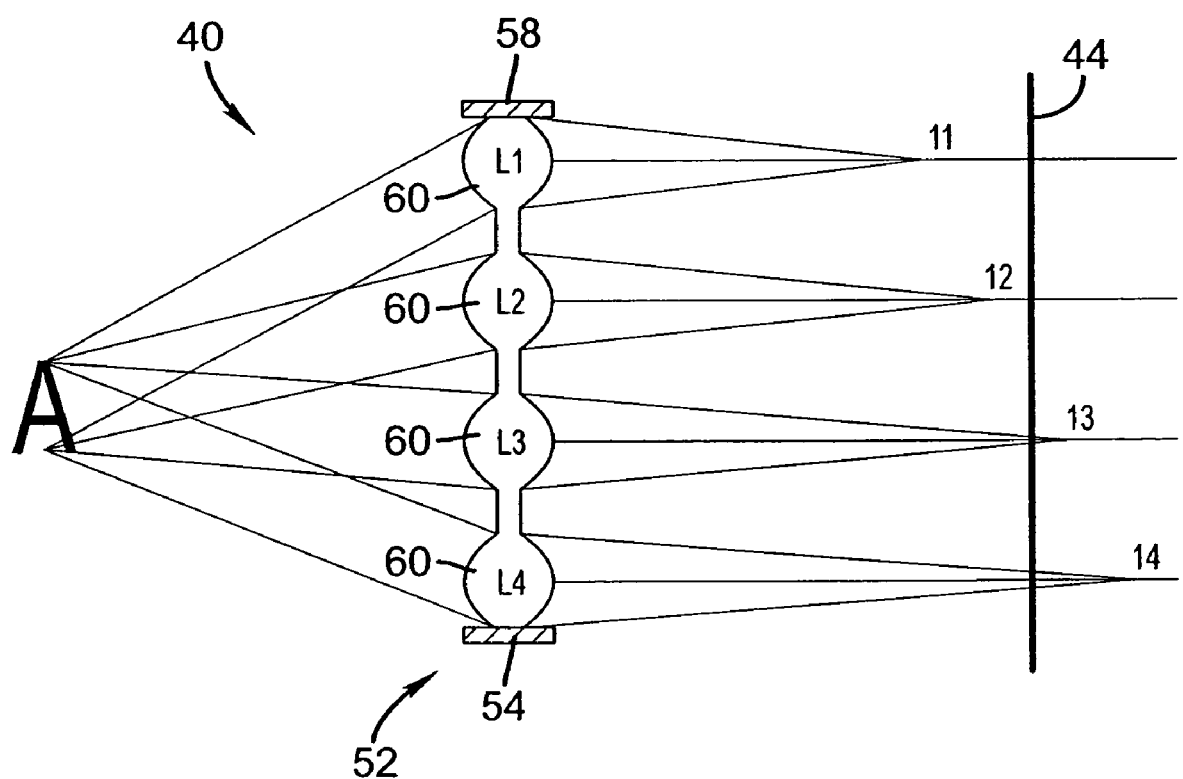
FIG. 5 is a schematic representation of a second example embodiment of the invention showing an array lenslets with each lenslet having distinct focal lengths, and therefore distinct conjugate planes or lengths.

Referring to FIG. 5, a schematic representation of a second example embodiment of the invention is shown. In the focus detection device 40 shown in FIG. 5, the distinct conjugate length of each of the plurality of lenslets is achieved by virtue of each of the plurality of lenslets having a distinct focal length when compared to each other.

In the second example embodiment, imaging occurs in different planes like the first example embodiment. However, the different imaging planes are achieved by designing a lenslet array 58 having a variety of focal lengths. This can be accomplished by providing a plurality of lenslets 60 with each lenslet 60 having a different lens formula that creates the distinct focal length for each lenslet 60. Thus, lenslets 60 of the second example embodiment are not required to lie in different planes to achieve different imaging planes. In operation, light flux coming from a subject impinges on image sensor 44 after passing through lenslet array 58 of focus detection device 40.

Lenslets 60 can be held in place using a lens retaining device 52, for example, a lens barrel 54. When individual lenslets 60 are used, lens barrel 54 can include spacers located therein to appropriately position each lenslet relative to each other and image sensor 44. Alternatively, lenslets 60 can be manufactured, for example, molded, as a single unit. Other aspects of the second example embodiment are similar to the first example embodiment.

Figure 6A:
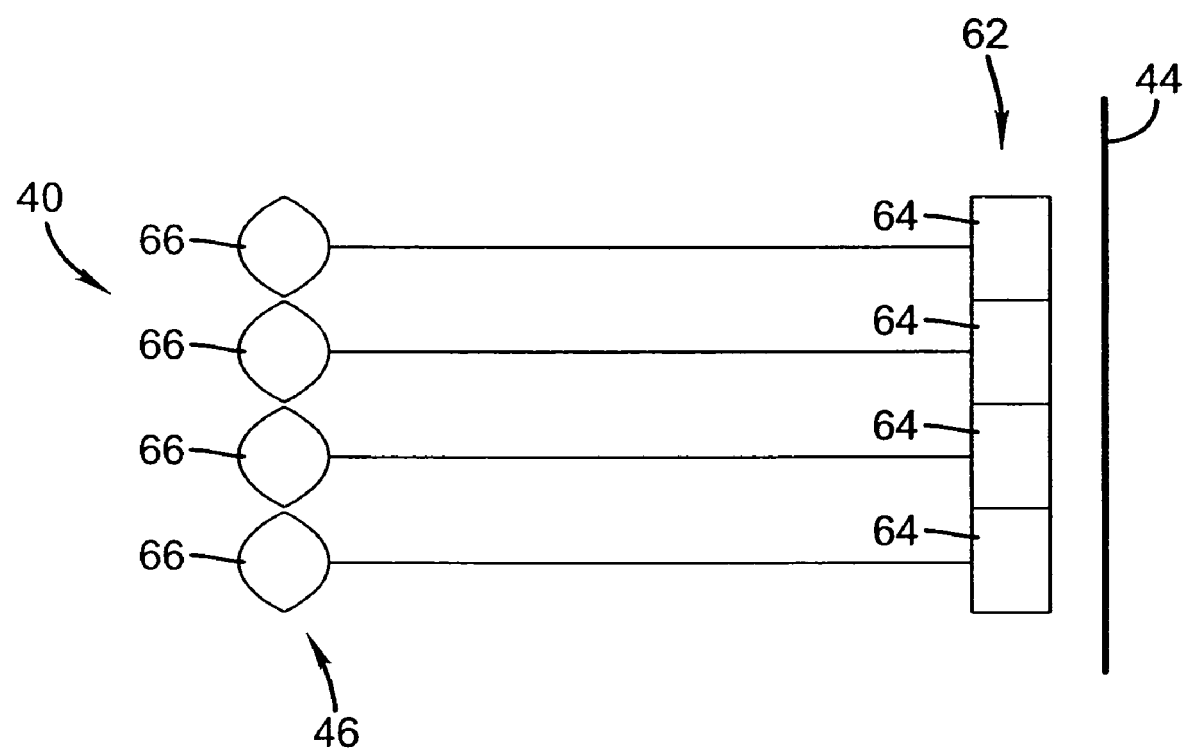
FIGS. 6A and 6B are schematic representations of a third and a fourth example embodiment of the invention showing an array of lenslets and a image sensor with a phase plate.
Figure 6B:
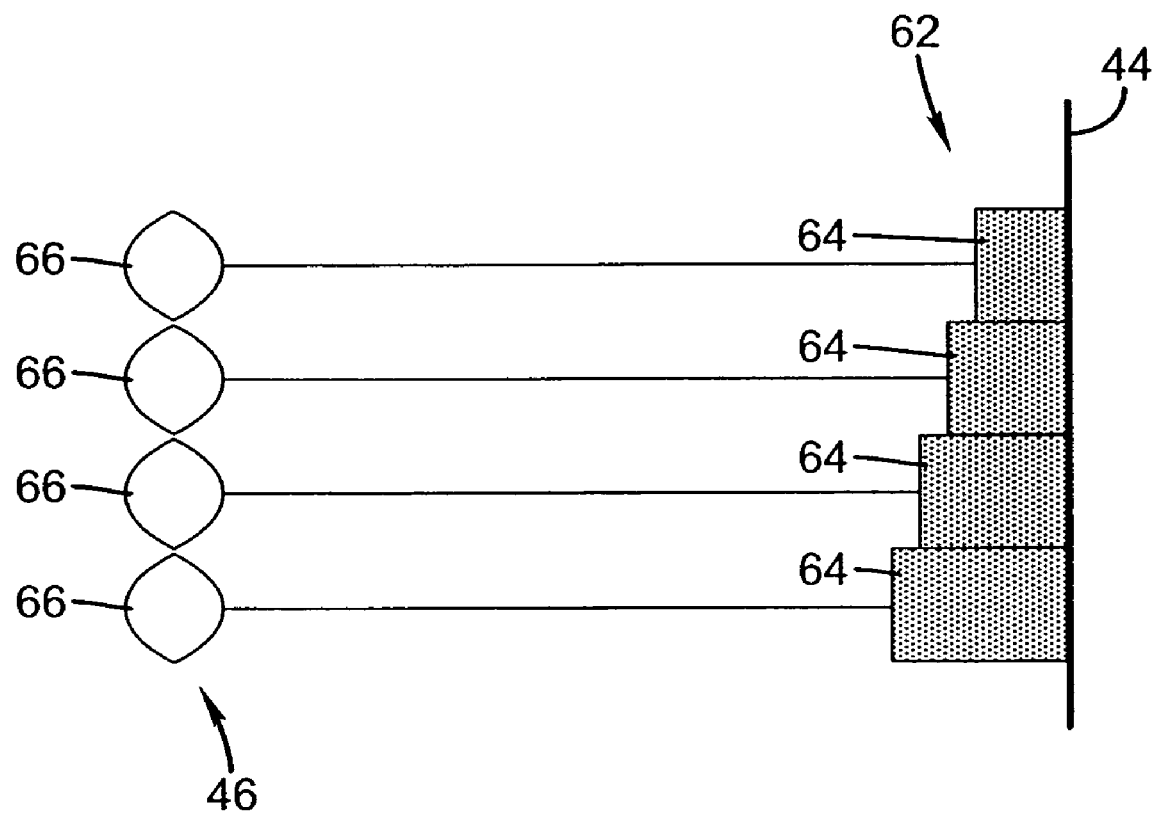

Referring to FIGS. 6A and 6B, a schematic representation of a third example embodiment of the invention is shown. In the focus detection device 40 shown in FIGS. 6A and 6B, a phase plate 62 having a plurality of portions 64 is positioned between the plurality of lenslets 66 and image sensor 44. The distinct conjugate length of each of the plurality of lenslets 66 is by virtue of each lenslet 66 being associated with a one of the plurality of portions 64 of the phase plate 62. The phase plate 62 can take several forms. For example, each portion 64 of phase plate 62 can have a distinct thickness when compare to other portions 64 of phase plate 62 as shown in FIG. 6B. Alternatively, each portion 64 of phase plate 62 can have a distinct refractive index when compared to other portions 64 of phase plate 62 as shown in FIG. 6A.

In the third and fourth example embodiments, different image planes for individual lenslets 66 are achieved by using a uniform lenslets array 46 with each lenslet 66 of the array 46 having identical focal lengths and being positioned in the same plane along an optical axis and adding phase plate 62 in front of image sensor 44. Phase plate 62 should have a thickness (or index of refraction) structure such that the lenslet 66 to-image sensor 44 optical path lengths span the range of the possible path lengths for imaging subjects of varying distances. In other words, each lenslet plus the associated phase plate optical thickness corresponds to a specific taking lens 70-to-second image sensor 84 distance. Lenslet plus phase plate structure is chosen such that the range of taking lens-to-second image sensor distances is spanned. Phase plate 62 can be incorporated into image sensor 44, be incorporated into lenslet array 46 unit, or be a separate component of focus detection device 40. The appropriate phase shifts in the phase plate can be achieved by causing the plate to have a gradation of thickness or by varying the optical index, or the like. Other aspects of the third and fourth example embodiments are similar to the first example embodiment.

Figure 7A:
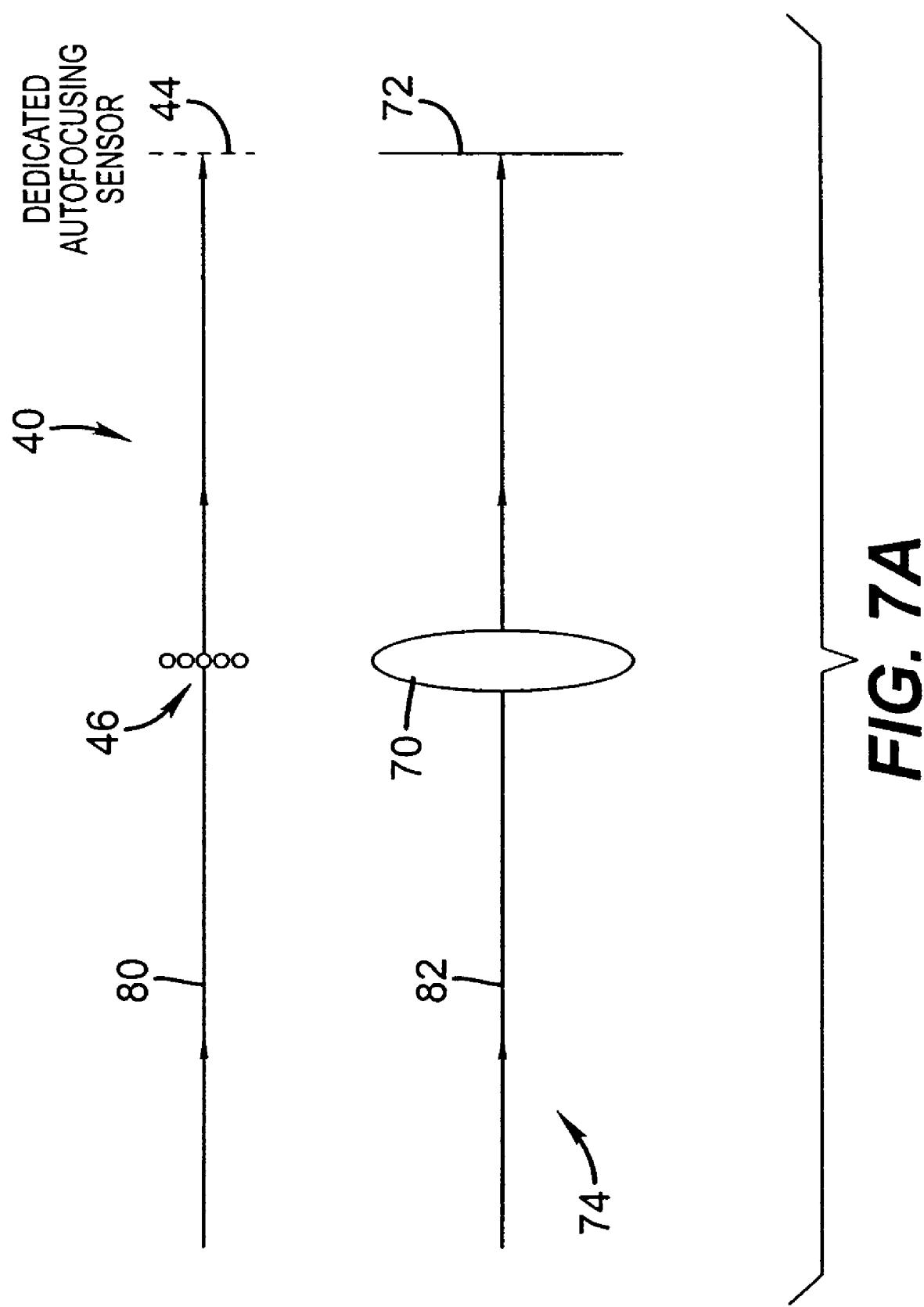
FIG. 7A is a schematic representation of the invention in an image capture device in which a first image sensor is dedicated to image acquisition and a second image sensor is dedicated to focus detection.

In the example embodiments described above, image sensor 44, or a first image sensor, can be dedicated to focus detection device 40. Accordingly, when focus detection device 40 is incorporated into an image capture device 74, for example, a digital camera, including a taking lens 70, another image sensor 72, or a second image sensor, is associated with the taking lens 70 and is dedicated to image acquisition as shown in FIG. 7A. In this sense, the first image sensor and the second image sensor are distinct image sensors.

In FIG. 7A, image capture device 74 includes focus detection device 40 and image sensor 44 are positioned along an optical axis 80. Taking lens 70 and image sensor 72 of image capture device 74 are positioned along another optical axis 82.

However, image capture device 74 and focus detection device 40 can share a common image sensor. In this sense, the first image sensor and the second image sensor are the same image sensor.

Figure 7B:
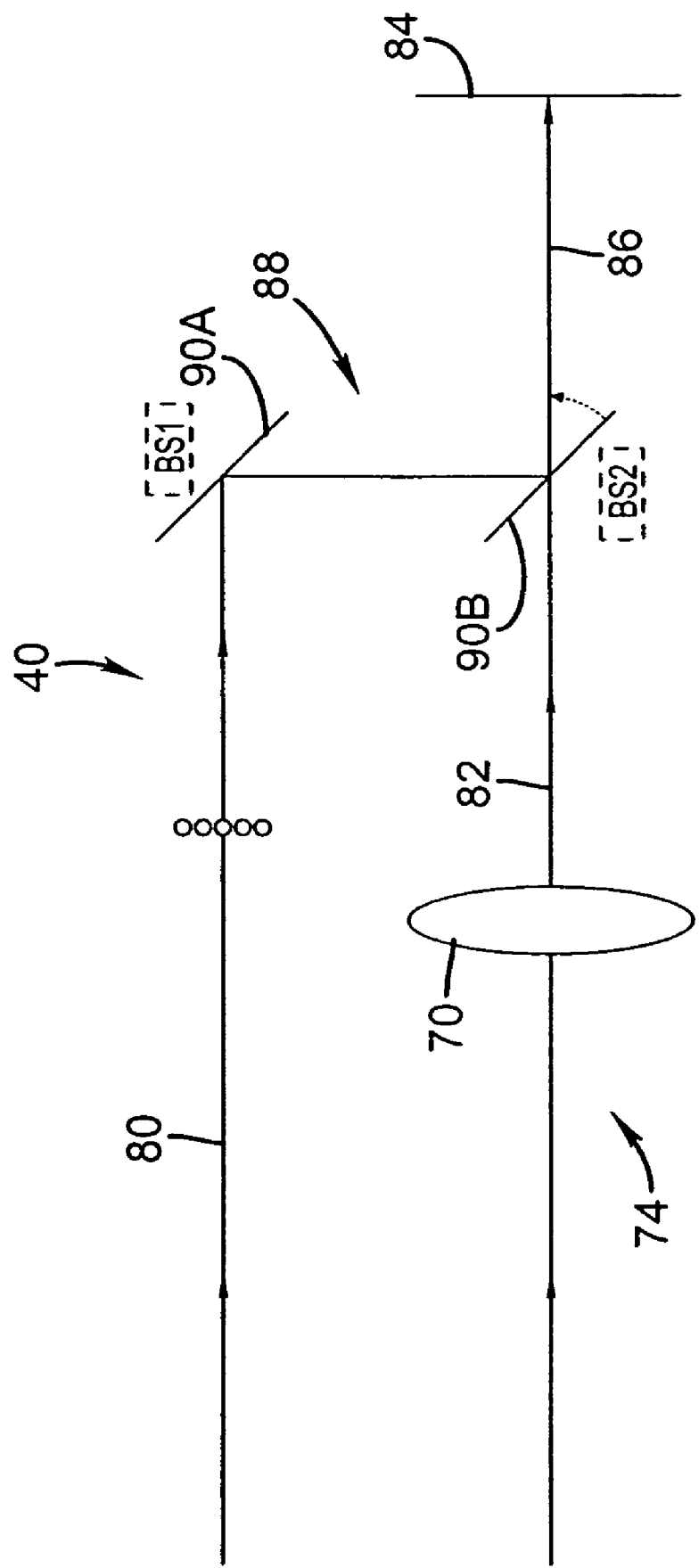
FIGS. 7B-7D are schematic representations of the invention in an image capture device in which an image sensor is shared between the image acquisition and focus detection systems.
Figure 7C:
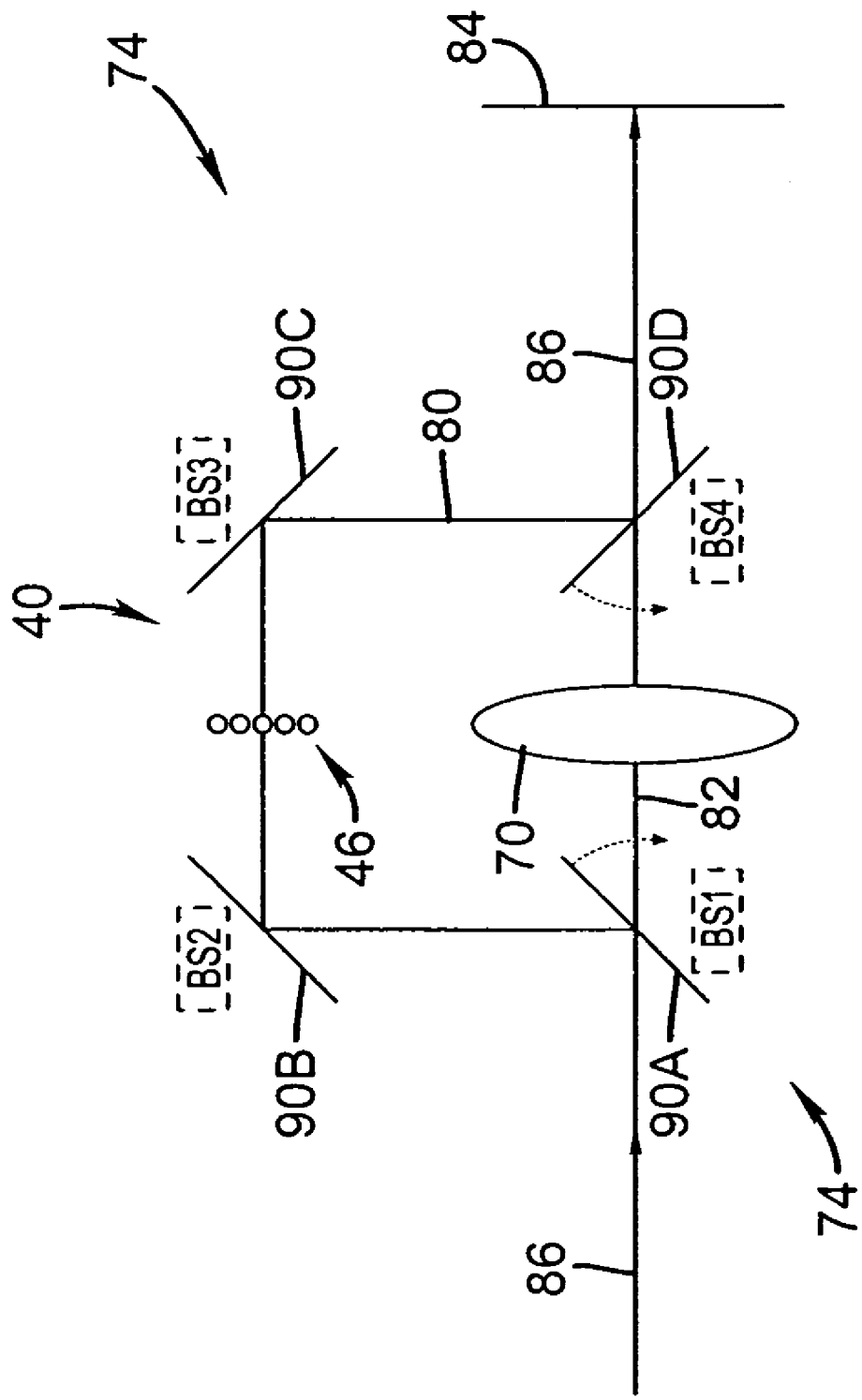
Figure 7D:
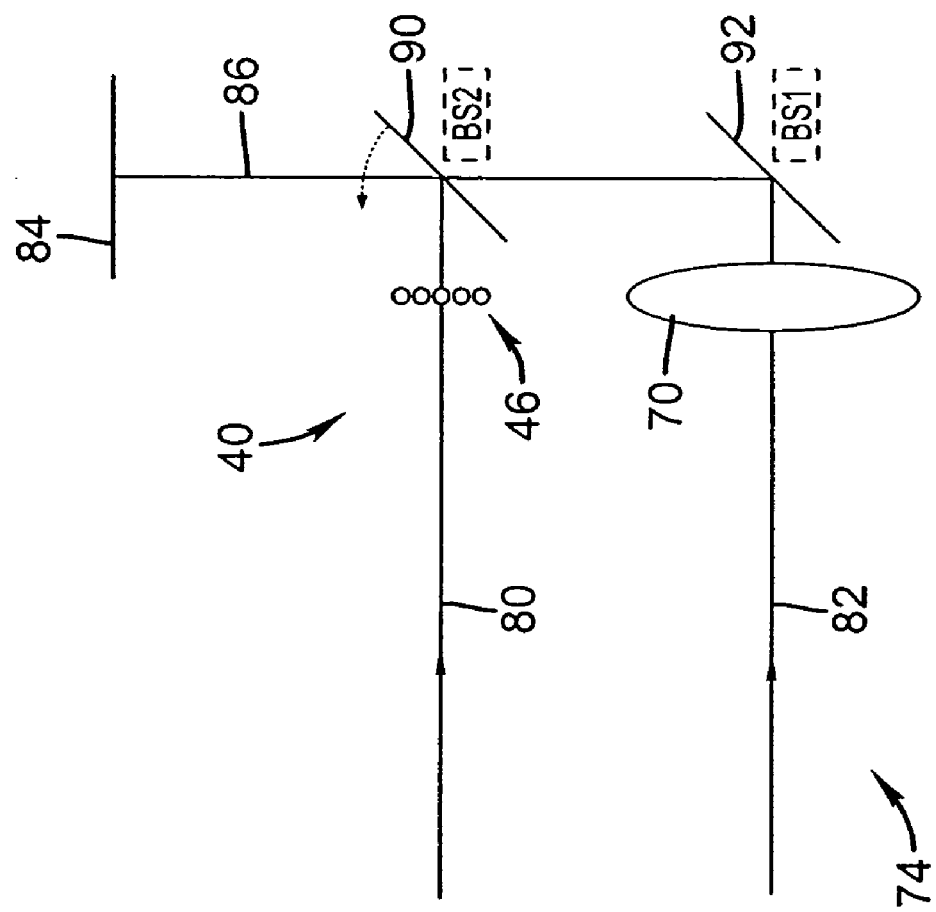

Referring to FIGS. 7B-7D, focus detection device 40 is positioned along an optical axis 80. Taking lens 70 is positioned along another optical axis 82. Focus detection device 40 and taking lens 70 share a common image sensor 84 and a common optical axis 86. An optical system 88 is associated with image sensor 84, taking lens 70, and focus detection device 40 and is operable to direct light from either focus detection device 40 or taking lens 70 to image sensor 84.

During image acquisition, optical system 88 permits light flux from a subject to travel along optical paths represented by optical axis 82 and 86, pass through taking lens 70, and be imaged onto image sensor 84. During autofocusing, optical system 88 alters the active optical path such that light flux from the subject travels along optical paths represented by optical axis 80 and 86 passing through focus detection device 40 onto image sensor 84. When this happens, light flux passing through taking lens 70 is partially or fully blocked by optical system 88.

Optical system 88 includes at least one mechanism 90, for example, a drop-in mirror or beam splitter, that causes light flux from the subject to switch between the two optical paths.

The precise configuration of optical system 88 depends on the configuration of image capture device 74.

Referring to FIG. 7B, an example configuration of optical system 88 including two mechanisms 90A and 90B, for example, drop-in mirrors, beam splitters, or combination thereof, is shown. The image taking optical path represented by optical axis 82 and 86 direct light from the subject through taking lens 70 to image sensor 84. When it is desired to make the focal point detection path represented by optical axis 80 and 86 active, mechanisms 90A and 90B move in a conventional manner to direct light from the subject through focus detection device 40 to image sensor 84. During this process, mechanisms 90 block all or part of the image taking light.

Referring to FIG. 7C, an example configuration of optical system 88 including four mechanisms 90A, 90B, 90C, and 90D, for example, drop-in mirrors, beam splitters, or combination thereof, is shown. When it is desired to make the focal point detection path represented by optical axis 80 and 86 active, light coming from the subject is redirected by mechanism 90A before passing through taking lens 70, directed through focus detection device 40 by mechanism 90B, and then directed to image sensor 84 two mechanisms 90C and 90D. When it is desired to make the image taking optical path represented by optical axis 82 and 86 active, mechanisms 90A and 90D move in a conventional manner to permit light to travel through taking lens 70 to image sensor 84.

Referring to FIG. 7D, an example configuration of optical system 88 including one mechanism 90, for example, a drop-in mirror or beam splitter, is shown. Image taking optical path represented by optical axis 82 and 86 is folded and includes a mechanism 92, for example, a drop-in mirror or beam splitter, positioned along optical axis 82. When it is desired to make the focal point detection path represented by optical axis 80 and 86 active, mechanism 90 moves in a conventional manner to direct light from the subject through focus detection device 40 to image sensor 84. During this process, mechanism 90 blocks all or part of the image taking light.

In the embodiments described with reference to FIGS. 7B-7D, light from either focus detection device 40 or taking lens 70 is directed onto most, if not all, areas of image sensor 84. However and referring to FIG. 8, image sensor 84 can include a plurality of portions 94 and 96 with one portion 94 of image sensor 84 being associated with taking lens 70 and another portion 96 of image sensor 84 being associated with lenslets 42 of focus detection device 40.

In this embodiment, a portion 94 of image sensor 84 architecture is used to collect light for image acquisition and portions 96 of image sensor 84 architecture that are not used for image acquisition are used to collect light for focus detection. Accordingly, no mechanism 90 is needed to switch between the image taking optical path and the focus detection optical path. In FIG. 8, unused image sensor areas or portions 96 are utilized for focus detection by appropriately positioning lenslets 42 of focus detection device 40 such that light from each lenslet 42 contacts the appropriate corresponding unused portion 96 of image sensor 84.

Figure 9:
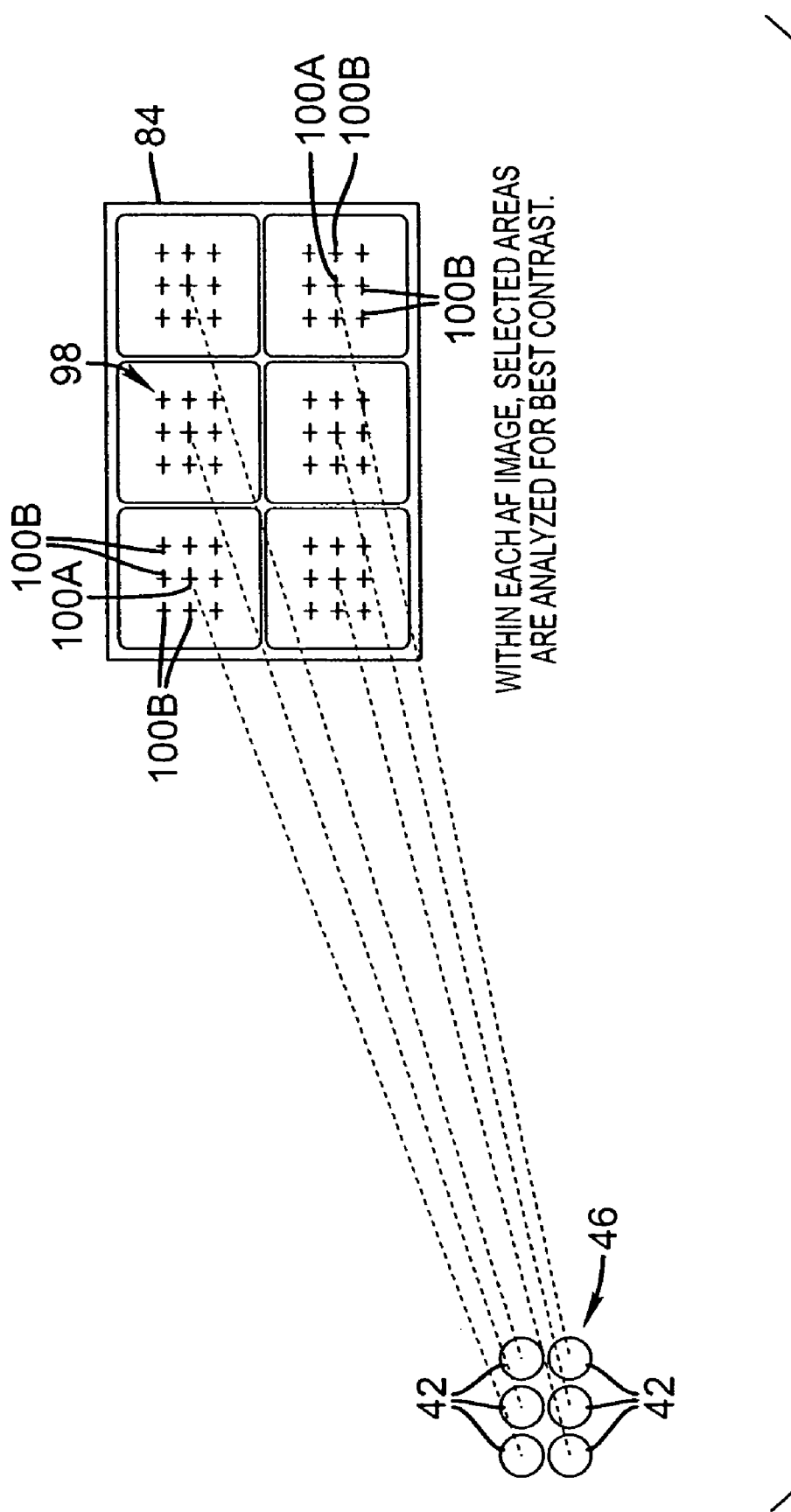
FIG. 9 is a schematic representation of the invention in which the invention is used to analyze different field areas for best contrast.

Referring to FIG. 9, a schematic representation of the invention in which the invention is used to analyze different field areas for best contrast is shown. The present invention provides the capability to use multiple field areas to assist with autofocusing. The image 98 of each lenslet 42 is divided into several field regions 100 (for example a central region 100A and multiple regions 100B around central region 100A). Each region 100 is analyzed for contrast as described above with reference to FIG. 1. The composite contrast data from each lenslet 42 and, optionally, the camera operator's chosen preferences (for example, center weighted, etc.) are used to determine the optimum focus for taking lens 70. Alternatively, a lenslet array 46, including a plurality of lenslets 42, can be dedicated to each field region of interest.

Figure 10B:
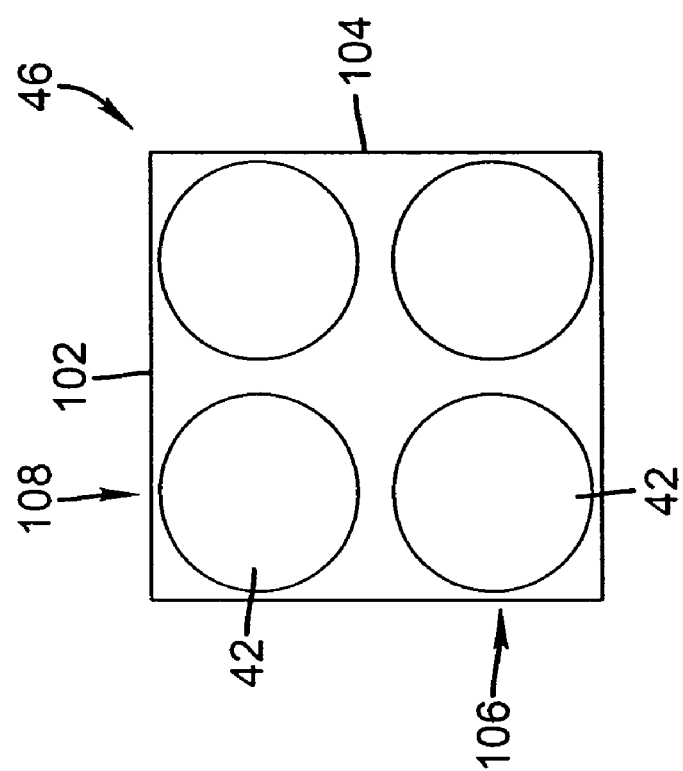
FIGS. 10A-10D are schematic representations of alternative lenslet array configurations.
Figure 10A:
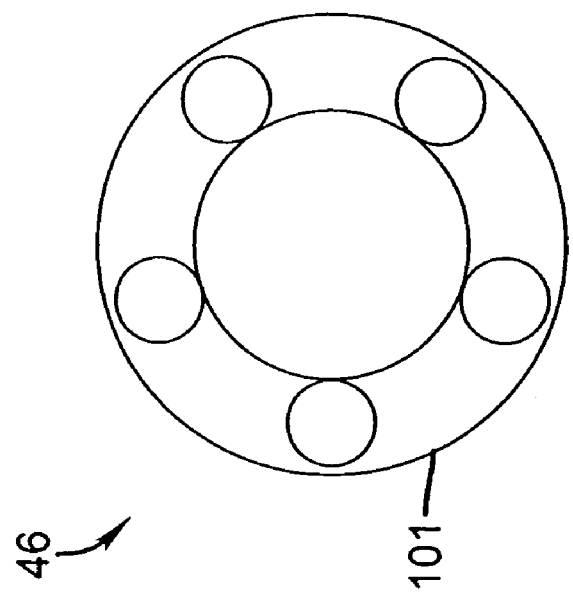
Figure 10D:
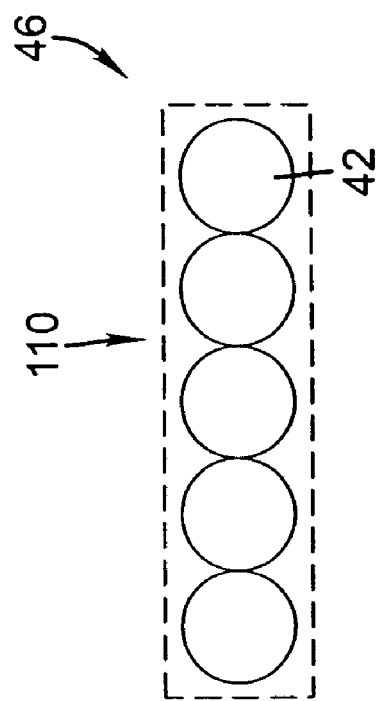
Figure 10C:
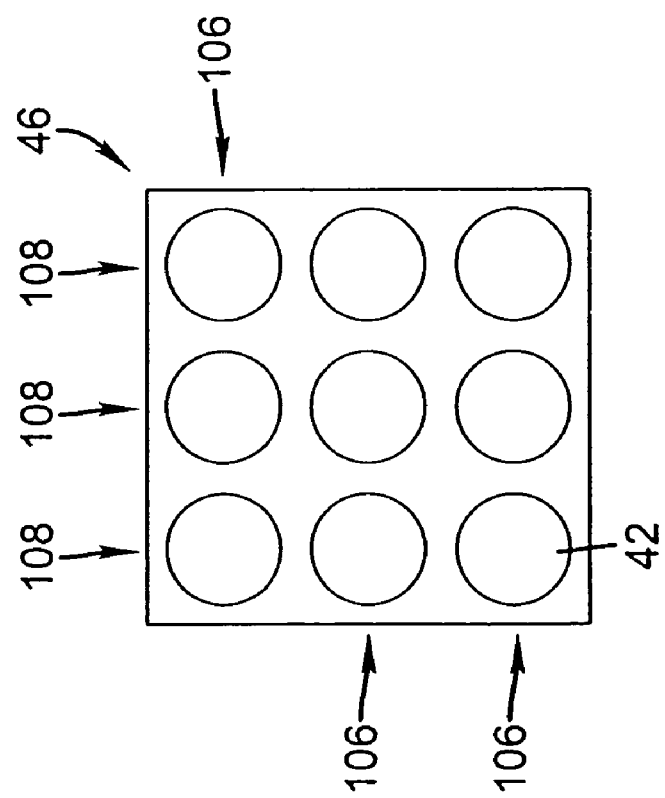

Referring to FIGS. 10A-10D, schematic representations of alternative lenslet array 46 configurations are shown. It should be understood that any lenslet array 46 geometry and configuration (including the number of lenslets 42, the shape of the array, the materials used in manufacture, etc.) that is appropriate to the contemplated image capture application can be incorporated into the present invention. For example, lenslet array 46 can have lenslets 42 arranged in a circular pattern and shape 101 as is shown in FIG. 10A. Lenslet array 46 can be two dimensional having lenslets 42 arranged along length 102 and width 104 dimensions in rows 106 and columns 108 of lenslet array 46 as is shown in FIGS. 10B and 10C. Lenslet array 46 can be a linear array 110 as is shown in FIG. 10D. The number of lenslets 42 can vary as is shown in FIGS. 10A-10D.

Experimental Testing Results

Figure 11:
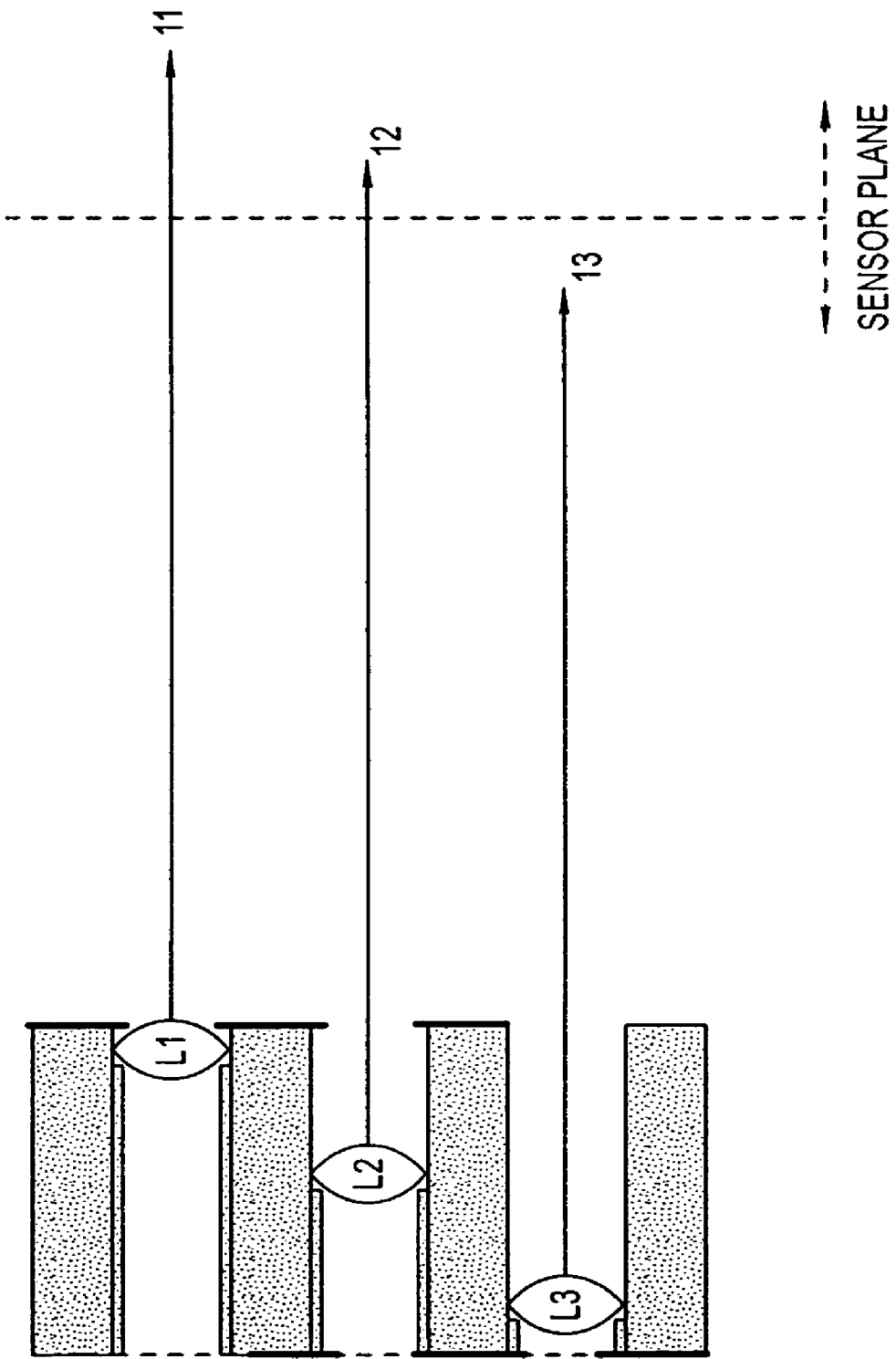
FIG. 11 is a schematic representation of the invention used for experimental testing purposes.

An array 46 of three lenslets 42 (Edmond Scientific PC SN 452730) was mounted to a digital camera module as indicated in FIG. 11. All lenslets had focal lengths of 12 mm and 3 mm diameters. The distances of the lenslets to image sensor 44 were set to approximately 12.05 mm (lenslet L1), 12.25 mm (lenslet L2) and 12.7 mm (lenslet L3) corresponding to in-focus images at approximately 130, 20 and 10 inches respectively.

A bar target was placed at a distance of 10 inches and the image produced on image sensor 44 was captured and analyzed for contrast (note that the image captured is actually a composite of three images produced by the three lenslets L1, L2, and L3). The same target was then enlarged such that when it was placed at a distance of 20 inches it produced approximately the same image size on image sensor 44. The image of the second target from 20 inches was then captured and analyzed for contrast. The same target was then enlarged such that when it was placed at a distance of 132 inches it again produced approximately the same image size on image sensor 44. The image of this target from 132 inches was then captured and analyzed for contrast.

Figure 12:
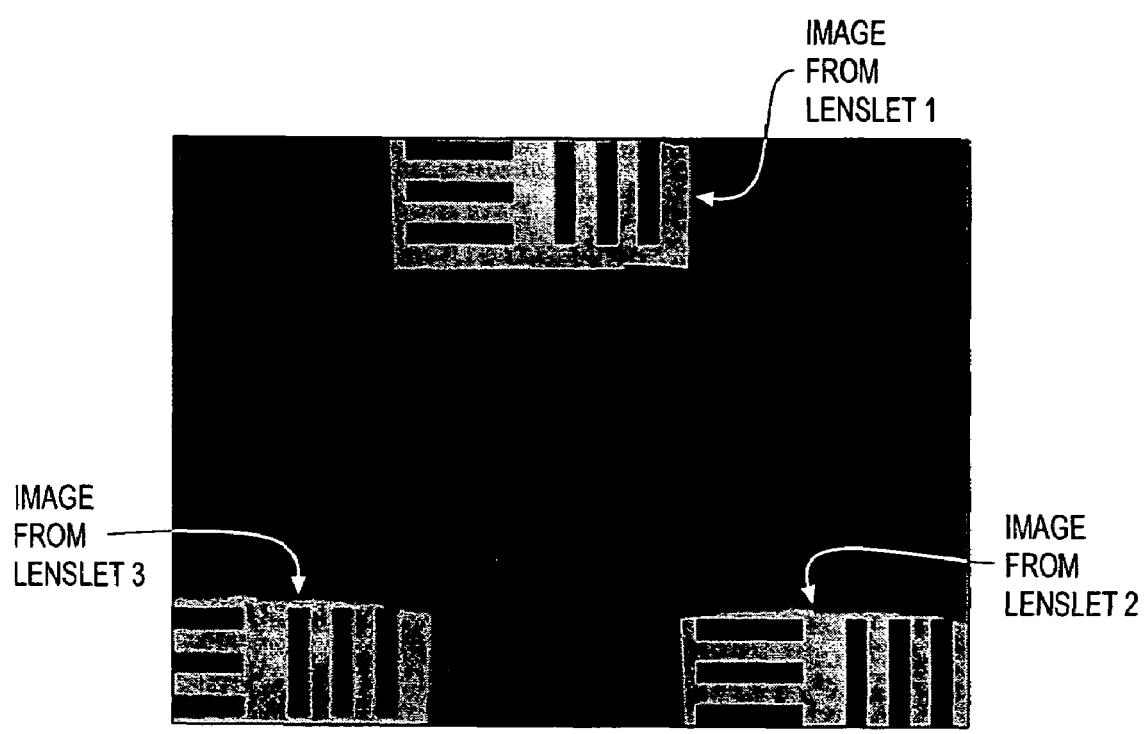
FIG. 12 shows the images resulting from experimental testing using the lenslet array of FIG. 11.

An example of a captured image is shown in FIG. 12. The bar target was imaged by the lenslets L1, L2, and L3 onto the image sensor 44 simultaneously, resulting in the three striped patterns shown in FIG. 12. This composite image was captured and the gray-levels of the captured image are analyzed. Specifically, the gray levels along a line across two of the bars were recorded and the contrast in gray levels between nearest neighbors calculated. The gray horizontal line in FIG. 12 indicates where the data was collected. It should be noted that the image in FIG. 12 illustrates the varying degrees of sharpness resulting from the three different lenslet to image sensor distances.

Figure 13A:
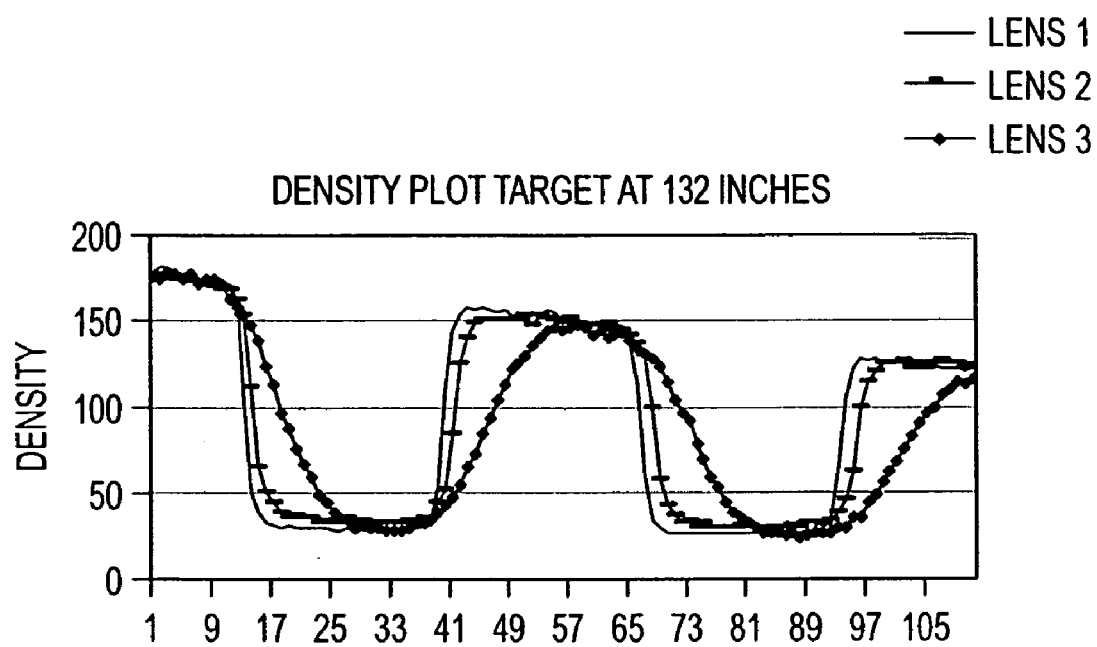
FIGS. 13A-13C are gray scale level plots of the images of FIG. 12 captured at the three target distances (132 inches, 20 inches, and 10 inches)
Figure 13B:
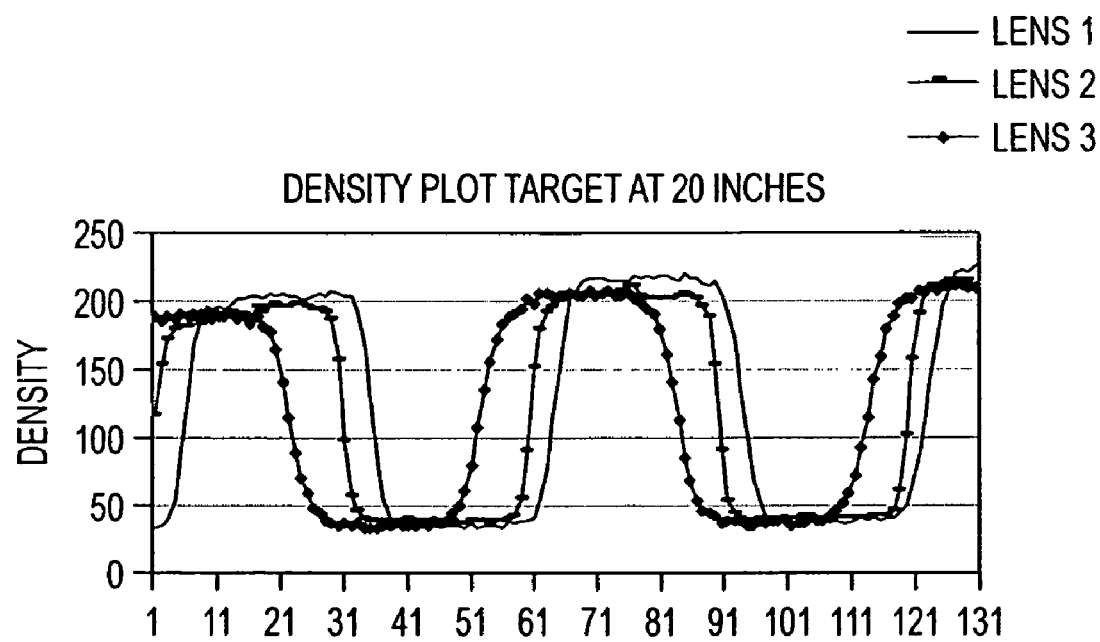
Figure 13C:
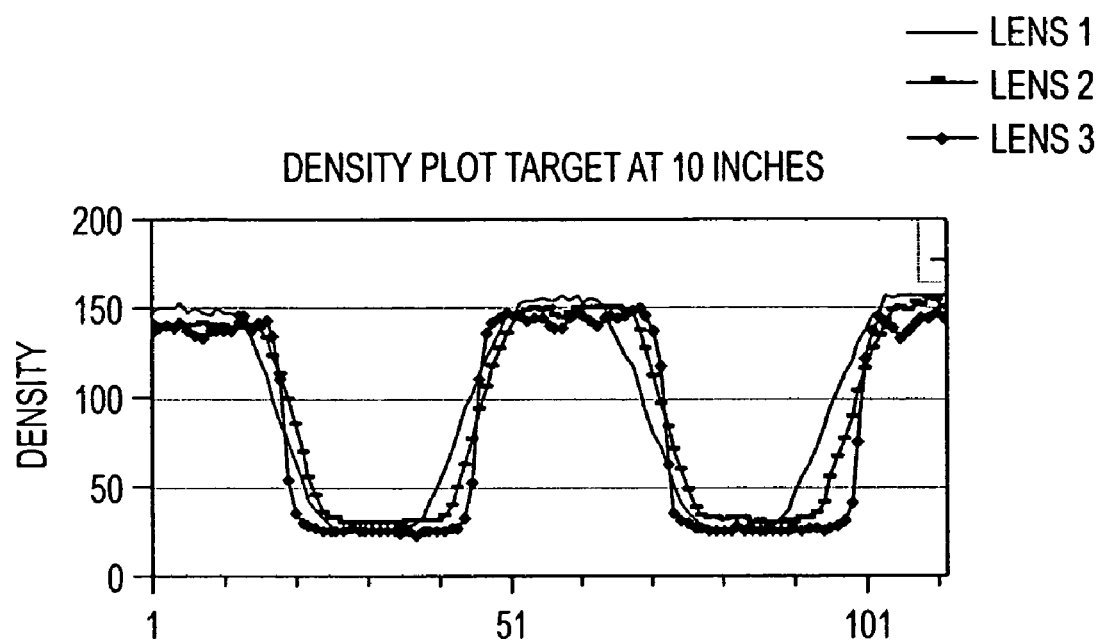

FIGS. 13A-13C are plots of gray levels of the lenslet images captured at the three target distances (132, 20 and 10 inches). High quality focus yields a sharp transition from white to black, in other words a square wave with steep transitions. A quantitative expression of the steepness of the transitions can be obtained by simply calculating the difference in gray levels for nearest neighbors (referred to here as nearest neighbor contrast).

Figure 14A:
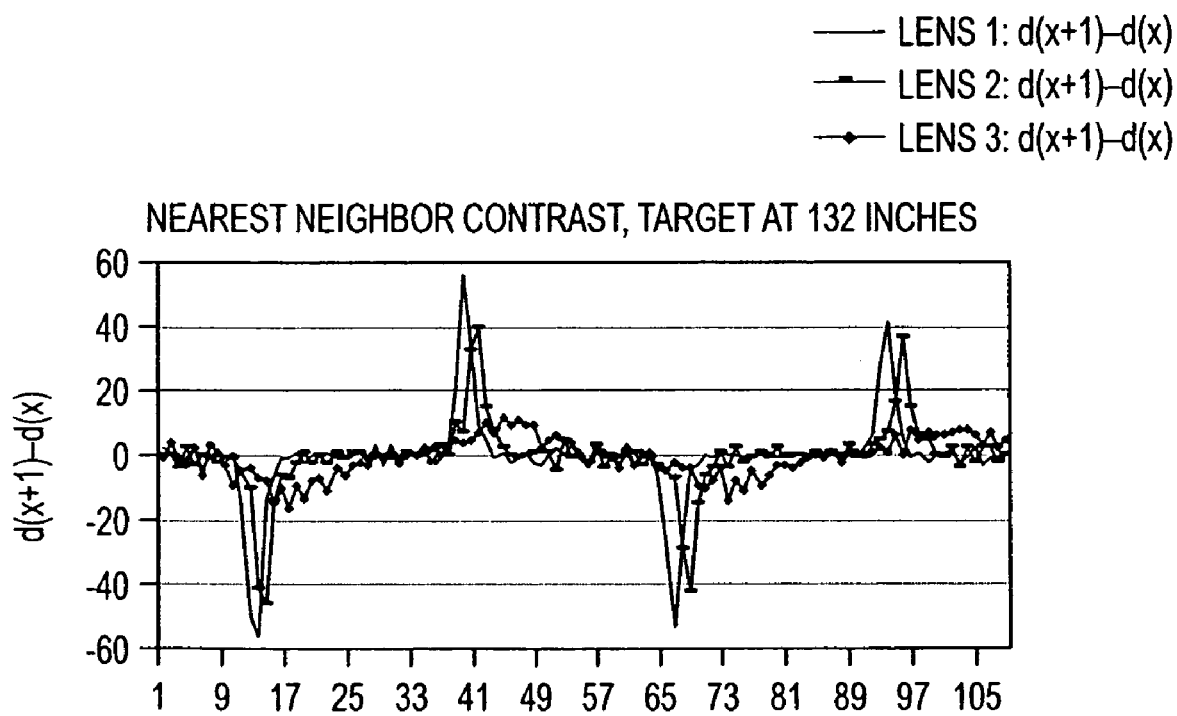
FIGS. 14A-14C are plots of nearest neighbor contrast in gray scale level for the sub-images produced by the lenslet array of FIG. 11 corresponding to the data of FIGS. 13A-13C.
Figure 14B:
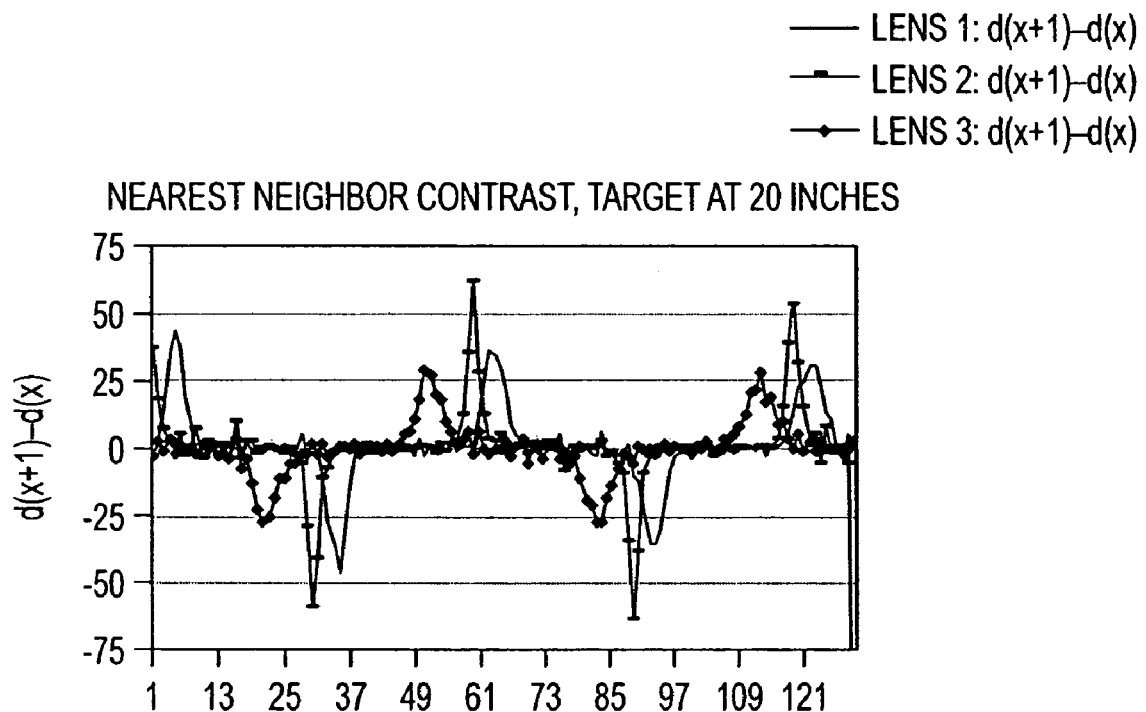
Figure 14C:
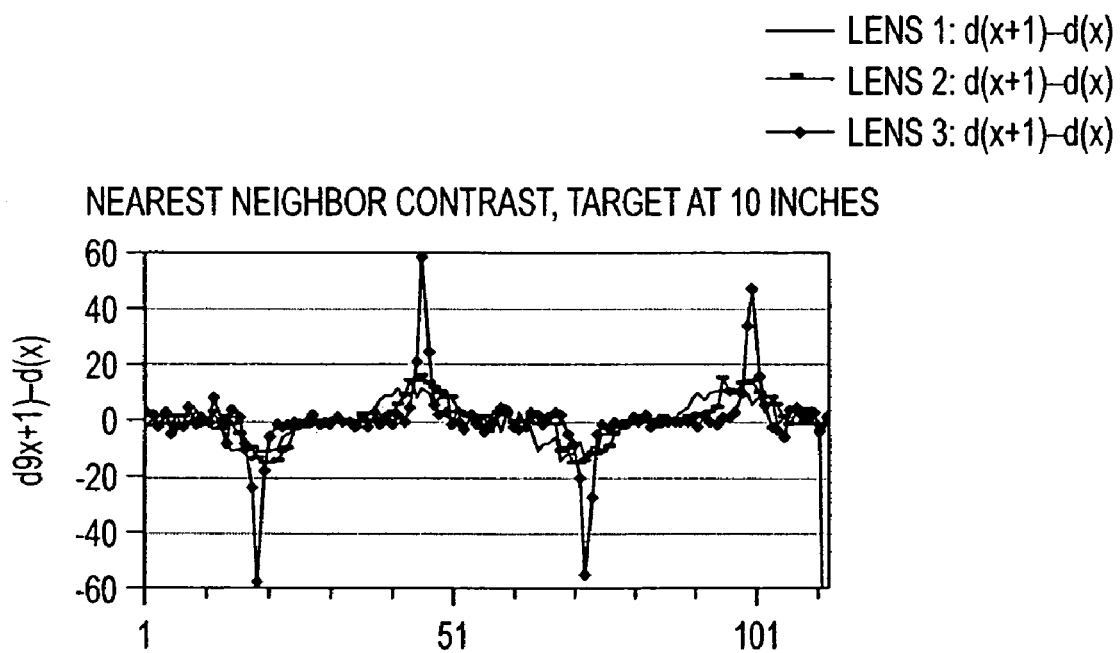

FIGS. 14A-14C are plots of nearest neighbor contrast in gray level for the sub-images produced by the three lenslets. As shown in FIG. 14A, lenslet L1 has the highest contrast, indicating that it is in best focus because lenslet L1 had a lenslet to image sensor distance of approximately 12.05 mm that should result in an in-focus image of a subject a distance of ~130 inches away. In FIG. 14B, lenslet L2 has the highest contrast indicating a subject distance of 20 inches. In FIG. 14C, lenslet L3 has the highest contrast indicating a subject distance of 10 inches.

The example embodiments of the present invention described herein can also be incorporated into an image capture device having a zoom capability by providing, for example, the appropriate look-up tables and by appropriately changing the sampled area. In the above described optical system 88 configurations, a partially silvered drop-in mirror or beam splitter may be beneficial for auto calibration. When these types of mechanism 90 are incorporated into focus detection device 40, images from both light paths can be compared during the auto calibration process.

The example embodiments of the present invention provide the opportunity to collect additional information about the scene or imaging conditions during the auto-focusing step, which may be useful to improve the image capture. This is because the autofocus images are generally representative of the actual captured images, with the exceptions that they have less resolution and possibly a smaller field of view and with the advantage that one of the autofocus images is always in focus. Thus one could, for example, increase the effective dynamic range of the image sensor by capturing the autofocus images with the first image sensor, analyzing the autofocus images for brightness conditions over the portions of the image, increasing the gain for portions of the second image sensor corresponding to the low brightness conditions in the portions of the autofocus images, and then capturing an image with increased dynamic range on the second image sensor.

Figure 15:
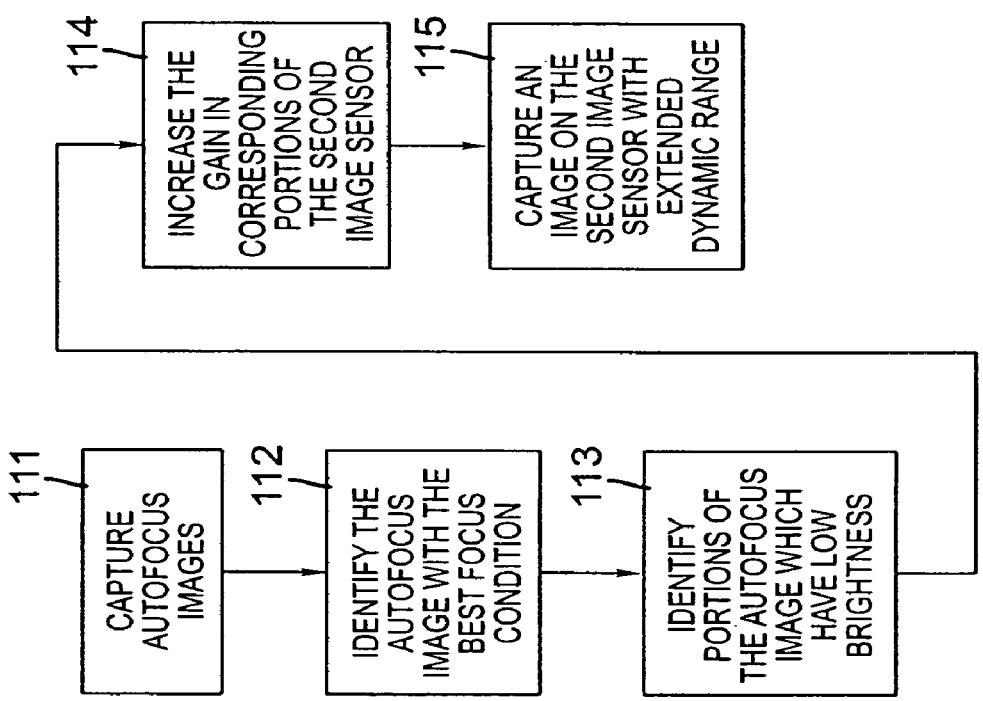
FIG. 15 is a flow chart of the process for making an extended dynamic range image.

FIG. 15 shows a flow chart of the method for producing an image with extended dynamic range. In step 111, the autofocus images are captured on the first image sensor 44. In step 112, the autofocus images 50 are analyzed to determine the autofocus image 50 with the best focus condition. Step 113 includes the process of identifying portions of the autofocus image 50 which have low brightness. The gain is then increased for the corresponding portions of the second image sensor 84 to increase the brightness of those areas in the image as captured on the second image sensor 84. Finally, the image is captured on the second image sensor 84 wherein the image has extended dynamic range.

Those skilled in the art will recognize that other improvements such as reduced over-exposure with the flash, redeye reduction and autoscene mode detection can be achieved in a similar manner by using the low resolution autofocus images to modify the image capture conditions with the second image sensor. It is conceivable that further information could be obtained from the autofocus images and utilized in subsequent camera operations.

The invention has been described in detail with particular reference to certain preferred embodiments thereof, but it will be understood that variations and modifications can be effected within the scope of the invention.

The invention claimed is:

1. A focus detection device comprising:
    an image sensor; and
        a plurality of lenslets, each of the plurality of lenslets having a distinct conjugate length, wherein each of the plurality of lenslets is associated with a distinct portion of the image sensor, and wherein the distinct conjugate lengths are arranged so that each of the plurality of lenslets will form an in-focus image on the distinct portion of the image sensor for objects at corresponding distinct object distances.

2. The device according to claim 1, wherein the distinct conjugate length of each of the plurality of lenslets results from each of the plurality of lenslets having a distinct focal length when compared to each other.

3. The device according to claim 1, wherein the distinct conjugate length of each of the plurality of lenslets results from each of the plurality of lenslets being positioned at distinct distances from the image sensor.

4. The device according to claim 1, further comprising:
    a phase plate having a plurality of portions, the phase plate being positioned between the plurality of lenslets and the image sensor, wherein the distinct conjugate length of each of the plurality of lenslets results from each lenslet being associated with one of the plurality of portions of the phase plate.

5. The device according to claim 4, wherein each portion of the phase plate has a distinct thickness when compared to other portions of the phase plate.

6. The device according to claim 4, wherein each portion of the phase plate has a distinct refractive index when compared to other portions of the phase plate.

7. A method of detecting focus comprising:
    providing a plurality of images on a first image sensor by causing light to pass through a plurality of lenslets, each of the plurality of lenslets having a distinct conjugate length, wherein the distinct conjugate lengths are arranged so that each of the plurality of lenslets will form an in-focus image on a distinct portion of the first image sensor for objects at corresponding distinct object distances;
    determining relative focus quality for the plurality of images by comparing the plurality of images to each other; and
    adjusting a distance between a taking lens and a second image sensor, the adjusted distance being determined responsive to the conjugate lengths of the plurality of lenslets and the relative focus quality for the plurality of images.

8. The method according to claim 7, wherein determining relative focus quality comprises determining relative contrast levels of each of the plurality of images.

9. The method according to claim 7, wherein determining relative focus quality comprises determining relative frequency content of each of the plurality of images.

10. The method according to claim 7, wherein determining relative focus quality comprises determining relative compressed file size of each of the plurality of images.

11. A method of detecting focus comprising:
    providing a plurality of images on an image sensor by causing light to pass through a plurality of lenslets, each of the plurality of lenslets having a distinct conjugate length, wherein the distinct conjugate lengths are arranged so that each of the plurality of lenslets will form an in-focus image on a distinct portion of the image sensor for objects at corresponding distinct object distances;
    determining relative focus quality for the plurality of images by comparing the plurality of images to each other; and
    adjusting a distance between a taking lens and the image sensor, the adjusted distance being determined responsive to the conjugate lengths of the plurality of lenslets and the relative focus quality for the plurality of images.

12. An image capture device comprising:
    a focus detection device including a first image sensor; and a plurality of lenslets, each of the plurality of lenslets having a distinct conjugate length, each of the plurality of lenslets being associated with a distinct portion of the first image sensor, wherein the distinct conjugate lengths are arranged so that each of the plurality of lenslets will form an in-focus image on the distinct portion of the first image sensor for objects at corresponding distinct object distances;

a taking lens; and a second image sensor, the second image sensor being associated with the taking lens.

13. An image capture device comprising:

a focus detection device including an image sensor; and a plurality of lenslets, each of the plurality of lenslets having a distinct conjugate length, each of the plurality of lenslets being associated with a distinct portion of the image sensor, wherein the distinct conjugate lengths are arranged so that each of the plurality of lenslets will form an in-focus image on the distinct portion of the image sensor for objects at corresponding distinct object distances;

a taking lens adapted for producing an image on the image sensor.

14. The device according to claim 13, the image sensor including a plurality of portions, wherein one portion of the image sensor is associated with the taking lens, and another portion of the image sensor is associated with the focus detection device.

15. The device according to claim 13, further comprising:

an optical system associated with the image sensor, the optical system being operable to direct light from either the focus detection device or the taking lens to the image sensor.

16. A method for producing a digital image with extended dynamic range comprising:

providing a plurality of images on a first image sensor by causing light to pass through a plurality of lenslets, each of the plurality of lenslets having a distinct conjugate length;

identifying dark portions of at least one of the plurality of images;

increasing gain for pixels of a second image sensor that correspond to the dark portions of the at least one of the plurality of images; and capturing an image with extended dynamic range with the second image sensor.

* * * * *